US010249305B2

(12) United States Patent
Yu

(10) Patent No.: US 10,249,305 B2
(45) Date of Patent: Apr. 2, 2019

(54) PERMUTATION INVARIANT TRAINING FOR TALKER-INDEPENDENT MULTI-TALKER SPEECH SEPARATION

(71) Applicant: Microsoft Technology Licensing, LLC, Redmond, WA (US)

(72) Inventor: Dong Yu, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/226,527

(22) Filed: Aug. 2, 2016

(65) Prior Publication Data
US 2017/0337924 A1    Nov. 23, 2017

Related U.S. Application Data

(60) Provisional application No. 62/339,061, filed on May 19, 2016.

(51) Int. Cl.
*G10L 21/0272* (2013.01)
*G06K 9/62* (2006.01)
(Continued)

(52) U.S. Cl.
CPC .............. *G10L 17/04* (2013.01); *G06K 9/624* (2013.01); *G06K 9/6246* (2013.01); *G10L 17/18* (2013.01);
(Continued)

(58) Field of Classification Search
CPC ... G10L 21/0272; G06K 9/624; G06K 9/6246
See application file for complete search history.

(56) References Cited

U.S. PATENT DOCUMENTS 5,150,323 A    9/1992  Castelaz
7,383,178 B2   6/2008  Visser et al.
(Continued)

FOREIGN PATENT DOCUMENTS

CN    102169690 A    8/2011
EP     1092964 B1   12/2007

OTHER PUBLICATIONS

Zaharis, Zaharias D., et al. "Design of a novel antenna array beamformer using neural networks trained by modified adaptive dispersion invasive weed optimization based data." IEEE Transactions on Broadcasting 59.3 (2013): 455-460.*
(Continued)

*Primary Examiner* — Richemond Dorvil
*Assistant Examiner* — Bryan S Blankenagel
(74) *Attorney, Agent, or Firm* — Schwegman Lundberg & Woessner, P.A.

(57) ABSTRACT

The techniques described herein improve methods to equip a computing device to conduct automatic speech recognition ("ASR") in talker-independent multi-talker scenarios. In some examples, permutation invariant training of deep learning models can be used for talker-independent multi-talker scenarios. In some examples, the techniques can determine a permutation-considered assignment between a model's estimate of a source signal and the source signal. In some examples, the techniques can include training the model generating the estimate to minimize a deviation of the permutation-considered assignment. These techniques can be implemented into a neural network's structure itself, solving the label permutation problem that prevented making progress on deep learning based techniques for speech separation. The techniques discussed herein can also include source tracing to trace streams originating from a same source through the frames of a mixed signal.

20 Claims, 11 Drawing Sheets

(51) Int. Cl.
  G10L 17/04    (2013.01)
  G10L 17/18    (2013.01)
  G10L 19/022   (2013.01)
  G10L 21/0208  (2013.01)
(52) U.S. Cl.
  CPC ........ *G10L 19/022* (2013.01); *G10L 21/0272* (2013.01); *G10L 2021/02087* (2013.01)

(56) References Cited

U.S. PATENT DOCUMENTS

| | | | |
|---|---|---|---|
| 7,464,029 B2 | 12/2008 | Visser et al. | |
| 8,175,291 B2* | 5/2012 | Chan | G10L 21/0208 381/94.7 |
| 8,898,056 B2* | 11/2014 | Chan | G10L 21/0272 704/205 |
| 2003/0055610 A1* | 3/2003 | Webber | G06K 9/624 702/194 |
| 2007/0083365 A1 | 4/2007 | Shmunk | |
| 2008/0052074 A1 | 2/2008 | Gopinath et al. | |
| 2009/0086998 A1* | 4/2009 | Jeong | H04R 3/005 381/119 |
| 2009/0192796 A1* | 7/2009 | Buck | G10L 21/0208 704/233 |
| 2009/0220065 A1* | 9/2009 | Ahuja | H04M 3/569 379/202.01 |
| 2009/0222262 A1* | 9/2009 | Kim | G10L 25/84 704/231 |
| 2010/0111192 A1* | 5/2010 | Graves | H04N 21/234 375/240.25 |
| 2010/0174389 A1* | 7/2010 | Blouet | G10L 21/028 700/94 |
| 2011/0257967 A1* | 10/2011 | Every | G10L 21/0208 704/226 |
| 2012/0120218 A1* | 5/2012 | Flaks | G10L 21/028 348/77 |
| 2014/0163982 A1 | 6/2014 | Daborn et al. | |
| 2015/0269933 A1 | 9/2015 | Yu et al. | |
| 2016/0111107 A1 | 4/2016 | Erdogan et al. | |
| 2017/0092265 A1* | 3/2017 | Sainath | G10L 15/16 |
| 2017/0295439 A1* | 10/2017 | Xu | A61N 1/36032 |

OTHER PUBLICATIONS

Abrash et al., "Connectionist Speaker Normalization and Adaptation," In Proceedings of Fourth European Conference on Speech Communication and Technology, Sep. 18, 1995, 4 pages.
Barker et al., "Speech fragment decoding techniques for simultaneous speaker identification and speech recognition," In Journal of Computer Speech and Language, vol. 24, Issue 1, Jan. 2010, pp. 94-111.
Bourlard et al., "Speech Pattern Discrimination and Multilayer Perceptrons," In Journal of Computer Speech & Language, vol. 3, Issue 1, Jan. 1989, 3 pages.
Cooke et al., "An audio-visual corpus for speech perception and automatic speech recognition," In Journal of Acoustical Society of America, vol. 120, Issue 5, Nov. 2006, pp. 2421-2424.
Cooke et al., "Monaural speech separation and recognition challenge," In Journal of Computer Speech & Language, vol. 24, Issue 1, Jan. 2010, pp. 1-15.
Dahl et al., "Context-dependent Pre-trained Deep Neural Networks for Large-vocabulary Speech Recognition," In Journal of IEEE Transactions on Audio, Speech, and Language Processing, vol. 20, Issue 1, Jan. 2012, pp. 30-42.
Every et al., "Enhancement of Harmonic Content of Speech Based on a Dynamic Programming Pitch Tracking Algorithm," In Proceedings of the Ninth International Conference on Spoken Language Processing, Sep. 17, 2006, 5 pages.
Gales, "Maximum likelihood linear transformations for hmm-based speech recognition," In Journal of Computer Speech & Language, vol. 12, Issue 2, Apr. 1998, 20 pages.

Geiger et al., "Memory-Enhanced Neural Networks and NMF for Robust ASR," In Journal of IEEE/ACM Transactions on Audio, Speech and Language Processing, vol. 22, Issue 6, Jun. 2014, pp. 1037-1046.
Ghahramani et al., "Factorial hidden Markov models," In Journal of Machine Learning, vol. 29, Issue 2-3, Nov. 1997, pp. 1-31.
Graves et al., "Hybrid Speech Recognition with Deep Bidirectional LSTM," In Proceedings of IEEE Automatic Speech Recognition and Understanding Workshop, Dec. 8, 2013, pp. 273-278.
Hermansky et al., "Tandem connectionist feature extraction for conventional hmm systems," In Proceedings of IEEE International Conference on Acoustics, Speech, and Signal Processing, vol. 3, Jun. 5, 2000, pp. 1-4.
Hershey et al., "Deep clustering: Discriminative embeddings for segmentation and separation," In Proceedings of IEEE International Conference on Acoustics, Speech and Signal Processing, Mar. 20, 2016, pp. 1-10.
Hinton et al., "Deep Neural Networks for Acoustic Modeling in Speech Recognition: The Shared Views of Four Research Groups," In IEEE Signal Processing Magazine, vol. 29, Issue 6, Nov. 2012, pp. 82-97.
Huang et al., "Joint Optimization of Masks and Deep Recurrent Neural Networks for Monaural Source Separation," In Journal of IEEE/ACM Transactions on Audio, Speech and Language Processing, vol. 23, Issue 12, Dec. 2015, pp. 2136-2147.
Hunt et al., "A comparison of several acoustic representations for speech recognition with degraded and undegraded speech," In Proceedings of IEEE International Conference on Acoustics, Speech, and Signal Processing, May 23, 1989, 4 pages.
Kristjansson et al., "Super-human multi-talker speech recognition: The IBM 2006 speech separation challenge system," In Proceedings of the Ninth International Conference on Spoken Language Processing, vol. 12, Sep. 17, 2006, 4 pages.
Li et al., "Improving Wideband Speech Recognition Using Mixed-Bandwidth Training Data in CD-DNN-HMM," In Proceedings of IEEE Spoken Language Technology Workshop, Dec. 2, 2012, pp. 131-136.
Lippmann et al., "Multi-style training for robust isolated-word speech recognition," In IEEE International Conference on Acoustics, Speech, and Signal Processing, vol. 12, Apr. 6, 1987., 4 pages.
Maas et al., "Recurrent Neural Networks for Noise Reduction in Robust ASR," In Proceedings of 13th Annual Conference of the International Speech Communication Association, Sep. 9, 2012, 4 pages.
Ming et al., "Combining missing-feature theory, speech enhancement and speaker-dependent/-independent modeling for speech separation," In Proceedings of the Ninth International Conference on Spoken Language Processing, Sep. 17, 2006, pp. 93-96.
Mohamed et al., "Acoustic Modeling Using Deep Belief Networks," In Journal of IEEE Transactions on Audio, Speech, and Language Processing, vol. 20, Issue 1, Jan. 2012, pp. 14-22.
Mohri et al., "Weighted Finite-State Transducers in Speech Recognition," In Journal of Computer Speech & Language, vol. 16, Issue 1, Jan. 2002, pp. 1-26.
Nam et al., "Blind Speech Separation Combining DOA Estimation and Assignment Problem Approaches," In Proceedings of the Second Symposium on Information and Communication Technology, Oct. 13, 2011, pp. 159-164.
Narayanan et al., "Investigation of Speech Separation as a Front-End for Noise Robust Speech Recognition," In Proceedings of IEEE/ACM Transactions on Audio, Speech, and Language Processing, vol. 22, Issue 4, Apr. 2014, pp. 826-835.
Rennie et al., "Single-Channel Multitalker Speech Recognition," In IEEE Signal Processing Magazine, vol. 27, Issue 6, Nov. 2010, pp. 66-80.
Sainath et al., "Auto-encoder bottleneck features using deep belief networks," In Proceedings of IEEE International Conference on Acoustics, Speech and Signal Processing, Mar. 25, 2012, pp. 4153-4156.
Schmidt et al., "Single-channel speech separation using sparse non-negative matrix factorization," In Proceedings of Ninth International Conference on Spoken Language Processing, Sep. 17, 2006, 4 pages.

(56) References Cited

OTHER PUBLICATIONS

Seide et al., "Feature engineering in context-dependent deep neural networks for conversational speech transcription," In Proceedings of IEEE Workshop on Automatic Speech Recognition & Understanding, Dec. 2011, pp. 24-29.
Seltzer et al., "An Investigation of Deep Neural Networks for Noise Robust Speech Recognition," In Proceedings of International Conference on Acoustics, Speech and Signal Processing, May 26, 2013, pp. 7398-7402.
Shao et al., "A computational auditory scene analysis system for speech segregation and robust speech recognition,"In Journal of Computer Speech and Language, vol. 24, Issue 1, Jan. 2010, pp. 73-93.
Talkin, "A Robust Algorithm for Pitch Tracking (RAPT)," In Publication of Elsevier Science BV—Speech Coding and Synthesis, Nov. 1995, pp. 495-518.
Vincent et al., "The second 'CHiME' speech separation and recognition challenge: Datasets, tasks and baselines," In Proceedings of IEEE International Conference on Acoustics, Speech and Signal Processing, May 2013, 6 pages.
Vinyals et al., "Revisiting recurrent neural networks for robust ASR," In Proceedings of IEEE International Conference on Acoustics, Speech and Signal Processing, Mar. 25, 2012, pp. 4085-4088.
Virtanen, "Speech recognition using factorial hidden Markov models for separation in the feature space," In Proceedings of the Ninth International Conference on Spoken Language Processing, Sep. 17, 2006, pp. 1-4.
Wang et al., "On training targets for supervised speech separation," In Journal of IEEE/ACM Transactions on Audio, Speech and Language Processing, vol. 22, Issue 12, Dec. 2014, pp. 1849-1858.
Weiss et al., "Monaural speech separation using source-adapted models," In Proceedings of IEEE Workshop on Applications of Signal Processing to Audio and Acoustics, Oct. 21, 2007, pp. 114-117.
Weng et al., "Deep Neural Networks for Single-Channel Multi-Talker Speech Recognition," In Journal of IEEE/ACM Transactions on Audio, Speech, and Language Processing, vol. 23, No. 10, Oct. 2015, pp. 1670-1679.
Weng et al., "Recurrent deep neural networks for robust speech recognition," In Proceedings of IEEE International Conference on Acoustic, Speech and Signal Processing, May 4, 2014, pp. 5569-5573.
Weng et al., "Single-channel Mixed Speech Recognition Using Deep Neural Networks," In Proceedings of IEEE International Conference on Acoustic, Speech and Signal Processing, May 2014, pp. 5669-5673.
Weninger et al., "The Munich 2011 CHiME Challenge Contribution: NMF-BLSTM Speech Enhancement and Recognition for Reverberated Multisource Environments," In Proceedings of Workshop on Machine Listening in Multisource Environments, Sep. 1, 2011, pp. 24-29.
Yu et al., "Feature Learning in Deep Neural Networks—Studies on Speech Recognition Tasks," In Proceedings of the Computing Research Repository, Jan. 2013, pp. 1-9.
Yu et al., "Improved bottleneck features using pretrained deep neural networks," In Proceedings of International Speech Communication Association, Aug. 28, 2011, pp. 237-240.
"International Search Report and Written Opinion Issued in PCT Application No. PCT/US2017/031473", dated Jul. 21, 2017, 12 Pages.
Yu, et al., "Permutation Invariant Training of Deep Models for Speaker-Independent Multi-Talker Speech Separation", In IEEE International Conference on Acoustics, Speech and Signal Processing, Mar. 5, 2017, pp. 241-245.
Allen, et al., "Image Method for Efficiently Simulating Small-Room Acoustics", In Journal of the Acoustical Society of America, vol. 65, Apr. 1979, pp. 943-950.
Amodei, et al., "Deep speech 2: End-to-end speech recognition in English and Mandarin", In Journal of Computing Research Repository, Jun. 11, 2016, pp. 1-28.

Anguera, et al., "Acoustic beamforming for speaker diarization of meetings", In IEEE Transactions on Audio, Speech, and Language Processing, vol. 15, Issue 7, Sep. 2007, 11 Pages.
Araki, et al., "DOA estimation for multiple sparse sources with normalized observation vector clustering", In Proceedings of IEEE International Conference on Acoustics Speech and Signal Processing, vol. 5, May 14, 2006, pp. 22-26.
Boeddeker, et al., "Exploring practical aspects of neural mask-based beamforming for far-field speech recognition", In IEEE International Conference on Acoustics, Speech and Signal Processing, Apr. 17, 2018, 5 Pages.
Cetin, et al., "Analysis of overlaps in meetings by dialog factors, hot spots, speakers, and collection site: Insights for automatic speech recognition", In Proceedings of Ninth International Conference on Spoken Language Processing, Sep. 17, 2016, pp. 293-296.
Chen, et al., "Deep attractor network for single-microphone speaker separation", In Proceedings of IEEE International Conference on Acoustics, Speech and Signal Processing, Mar. 5, 2017, 5 Pages.
Chen, et al., "Progressive joint modeling in unsupervised single-channel overlapped speech recognition", In Journal of Computing Research Repository, Jul. 2017, pp. 1-14.
Chiu, et al., "Speech recognition for medical conversations", In Journal of Computing Research Repository, Nov. 2017, 5 Pages.
Drude, et al., "Source counting in speech mixtures using a variational em approach for complex watson mixture models", In IEEE International Conference on Acoustics, Speech and Signal Processing, May 4, 2014, pp. 6834-6838.
Drude, et al., "Tight integration of spatial and spectral features for BSS with deep clustering embeddings", In Proceedings of 18th Annual Conference of the International Speech Communication Association, Aug. 20, 2017, pp. 2650-2654.
Edwards, et al., "Medical speech recognition: Reaching parity with humans", In Proceedings of 19th International Conference on Speech and Computer, Sep. 12, 2017, 10 Pages.
Erdogan, et al., "Improved MVDR beamforming using single-channel mask prediction networks", In Interspeech, Sep. 8, 2016, pp. 1981-1985.
Fiscus, et al., "Multiple dimension Levenshtein edit distance calculations for evaluating automatic speech recognition systems during simulaneous speech", In Proceedings of the International Conference on language Resources and Evaluation, May 2006, pp. 803-808.
Fiscus, et al., "The Rich Transcription 2005 Spring Meeting Recognition Evaluation", In Proceedings of Machine Learning for Multimodal Interaction, Second International Workshop, Jul. 11, 2005, 21 Pages.
Hain, et al., "Transcribing meetings with the AMIDA systems", In Journal of IEEE Transactions on Audio, Speech, and Language Processing, vol. 20, issue 2, Feb. 2012, pp. 486-498.
Heymann, et al., "BeamNet: End-to-end training of a beamformersupported multi-channel ASR system", In Proceedings of IEEE International Conference on Acoustics, Speech and Signal Processing, Mar. 5, 2017, pp. 5325-5329.
Heymann, et al., "BLSTM supported GEV beamformer front-end for the 3rd CHiME challenge", In Proceedings of IEEE Workshop on Automatic Speech Recognition and Understanding, Dec. 13, 2015, pp. 444-451.
Higuchi, et al., "Deep clustering-based beamforming for separation with unknown number of sources", In Proceedings of Interspeech, Aug. 20, 2017, 2 Pages.
Hori, et al., "Low-latency real-time meeting recognition and understanding using distant microphones and omni-directional camera", In Journal of IEEE Transactions on Audio, Speech & Language Processing, vol. 20, Issue 2, Feb. 2012, pp. 499-513.
Kolbaek, et al., "Multitalker speech separation with utterance-level permutation invariant training of deep recurrent neural networks", In Journal of IEEE/ACM Transactions on Audio, Speech and Language Processing, vol. 25, Issue 10, Oct. 2017, pp. 1901-1913.
Li, et al., "Acoustic modelling for Google Home", In Journal of Interspeech, Aug. 20, 2017, pp. 399-403.
Li, et al., "Large scale domain adaptation via teacher-student learning", In Proceedings of International Speech Communication Association, Aug. 20, 2017, 5 Pages.

(56) References Cited

OTHER PUBLICATIONS

Mohamed, et al., "Deep bi-directional recurrent networks over spectral windows", In Proceedings of IEEE Workshop on Automatic Speech Recognition and Understanding, Dec. 13, 2015, pp. 78-83.
Nesta, et al., "Convolutive bss of short mixtures by ica recursively regularized across frequencies", In Journal of IEEE Transactions on Audio, Speech, and Language Processing, vol. 19, Issue 3,, Mar. 2011, pp. 624-639.
Povey, et al., "The Kaldi speech recognition toolkit", In Proceedings of IEEE workshop on automatic speech recognition and understanding, 2011, 4 Page.
Renals, et al., "Distant Speech Recognition Experiments Using the AMI Corpus", In Publication of New Era for Robust Speech Recognition, Jul. 26, 2017.
Sawada, et al., "Underdetermined convolutive blind source separation via frequency bin-wise clustering and permutation alignment", In Proceedings of IEEE Transactions on Audio, Speech, and Language Processing, vol. 19, No. 3, Mar. 2011, pp. 516-527.
Seide, et al., "1-Bit Stochastic Gradient Descent and its Application to Data-Parallel Distributed Training of Speech DNNs", In Proceedings of 15th Annual Conference of the International Speech Communication Association, Sep. 14, 2014, pp. 1058-1062.
Souden, et al., "A multichannel MMSE-based framework for speech source separation and noise reduction", In Journal of IEEE Transactions on Audio, Speech and Language Processing, vol. 21, Issue 9, Sep. 2013, pp. 1913-1928.
Souden, et al., "On optimal frequency-domain multichannel linear filtering for noise reduction", In Journal of IEEE Transactions on audio, speech, and language processing, vol. 18, Issue 2, Feb. 2010, pp. 260-276.
Vu, et al., "Blind speech separation employing directional statistics in an expectation maximization framework", In Proceedings of IEEE International Conference on Acoustics Speech and Signal Processing, Mar. 14, 2010, pp. 241-244.
Wang, et al., "A maximum likelihood approach to deep neural network based nonlinear spectral mapping for single-channel speech separation", In Proceedings of 18th Annual Conference of the International Speech Communication Association, Aug. 20, 2017, pp. 1178-1182.
Xiong, et al., "Achieving human parity in conversational speech recognition", In Journal of Computing Research Repository, Oct. 2016, 13 Pages.
Yoshioka, et al., "Blind Separation and Dereverberation of Speech Mixtures by Joint Optimization", In Journal of IEEE Transactions on Audio, Speech, and Language Processing, vol. 19, Issue 1, Jan. 2011, pp. 69-84.
Yoshioka, et al., "Generalization of multi-channel linear prediction methods for blind MIMO impulse response shortening", In Journal of IEEE Transactions on Audio, Speech, and Language Processing, vol. 20, Issue 10, Dec. 2012, pp. 2707-2720.
Yoshioka, et al., "Multimicrophone neural speech separation for far-field multi-talker Speech Recognition", In Proceedings of ICASSP, Apr. 17, 2018, 5 Pages.
Yoshioka, et al., "The NTT CHiME-3 system: advances in speech enhancement and recognition for mobile multi-microphone devices", In Proceedings of IEEE Workshop on Automatic Speech Recognition and Understanding, Dec. 13, 2015, pp. 436-443.
Zhang, et al., "Binaural reverberant speech separation based on deep neural networks", In Proceedings of Binaural reverberant speech separation based on deep neural networks, Aug. 20, 2017, pp. 2018-2022.
Zmolikova, et al., "Learning speaker representation for neural network based multichannel speaker extraction", In Proceedings of IEEE Automatic Speech Recognition and Understanding Workshop, Dec. 16, 2017, pp. 8-15.
Makino, et al., "Blind speech separation", In Book Series of Signals and Communication Technology book, 2007, 439 Pages.

\* cited by examiner

PERMUTATION INVARIANT TRAINING FOR TALKER-INDEPENDENT MULTI-TALKER SPEECH SEPARATION

PRIORITY

This application claims the benefit of the priority date of U.S. Provisional Application No. 62/339,061 filed on May 19, 2016, pursuant to 37 C.F.R. 1.78.

BACKGROUND

In recent years, the accuracy of automatic speech recognition ("ASR") systems has significantly improved thanks to the deep learning techniques exploited in recent ASR systems. In 2010, the word error rate (WER) on the widely accepted Switchboard conversation transcription benchmark task was over 20% and in 2016, due to developments in deep learning, it has been reduced to below 7%.

Although this impressive progress has been made for dictating single-speaker speech, progress in ASR for multi-talker mixed speech separation, tracing, and recognition, often referred to as the cocktail-party problem, has been less impressive. Although human listeners can easily perceive separate sources in an acoustic mixture the same task seems to be difficult for automatic computing systems, especially when only a single-channel of mixed-speech is available.

Current solutions are limited by only functioning for a closed-set of talkers, failing to scale with increased speakers or vocabularies; only separating highly different signals (e.g., separating music from a talker) instead of the more difficult task of separating similar signals, such as multiple talkers; relying on talker-dependent models that require identifying talkers at training time and collecting data from the talkers, resulting in a limited vocabulary, grammar, and talker set; assuming that time-frequency bins only belong to one speaker; or having portions that are not jointly-trainable and therefore limit system performance.

SUMMARY

This summary is provided to introduce simplified concepts relating to permutation invariant training for talker-independent multi-talker speech separation. This summary is not intended to identify essential features of the claimed subject matter, nor is it intended for use in determining the scope of the claimed subject matter.

The techniques described herein equip a computing device to conduct automatic speech recognition ("ASR") in talker-independent multi-talker scenarios, which means that the techniques are able to detect and attribute portions of a mixed signal to a talker from among multiple talkers that contribute to the mixed signal, regardless of whether the techniques have previously received data related to the talker before, whether at training or earlier in the evaluation. In other words, the techniques described herein enable ASR for multiple talkers, even when speech overlaps, and even when talkers disappear from or previously-un-encountered talkers appear in the signal. Examples of the scenarios for which a computing device is enabled by the techniques discussed herein include automatic meeting and lecture transcription; automatic captioning for audio/video recordings; multi-party human-machine interactions (e.g., in the world of Internet of things (IoT)), where speech overlapping is commonly observed; etc. It is also important for signal augmentation techniques, such as, for example, smarter hearing aids that can isolate a particular signal from a mix and boost, cut, or otherwise modify that particular signal, signal detection and boosting, live audio production, etc.

In some examples, the techniques discussed herein include permutation invariant training of deep learning models. The techniques discussed herein overcome drawbacks and limitations of former attempts at solutions to the label ambiguity or label permutation problem. For example, former attempts utilize deep learning models trained on parallel sets of mixtures and their constituent target sources to predict the source belonging to a target class, usually on each time-frequency. These former attempts to isolate talkers from multiple talkers are severely limited in that they rely on talker-dependent models by assuming that the talker is known during the training time, which results in a closed set of target speakers at evaluation time and often only works on limited vocabulary and grammar. The former attempts also assign labels based on the instantaneous energy of a signal, which is problematic, because the instantaneous energy for a talker can change if the talker moves to a different location, if a direction the talker is facing changes, or if the talker talks more loudly or more softly.

The techniques discussed herein employ permutation invariant training ("PIT", also permutation invariant trained, within the context, e.g., PIT model) of deep learning models for speech separation that functions for independent talkers in a multi-talker signal. In a departure from former solutions that treat speech separation as a multi-class regression, segmentation, or clustering problem where a first generated signal estimate is treated as being attributable to a first signal source, the techniques discussed herein optimize a deep learning model for the separation regression error (i.e., deviation), ignoring the order of mixing sources. In other words, the appropriate signal source to which a given output of a neural network can vary, meaning there may be a number of permutations of possible matches between an output of a neural network and the appropriate signal source (i.e., S! possible permutations where S is a number of the signal sources). Specifically, the techniques discussed herein can first determine the best output-target assignment and then minimize the deviation (e.g., error) of the best output-target assignment (where "output" refers to the deep learning model's output for an attempt to isolate a particular source signal for a particular "target" source). These techniques can be implemented within the neural network's structure itself, solving the label permutation problem that prevented making progress on deep learning based techniques for speech separation. The techniques discussed herein can also include source (e.g., talker, noise) tracing that works together with the PIT deep learning model discussed herein to trace streams originating from a same source through multiple frames of a mixed signal. In other words, the techniques discussed herein can compensate for permutations in the training label.

The techniques discussed herein improve the ability of a computing device to separate signals from a mixed signal such as, for example, speech signals from among multiple equal or close-to-equal speech signals. The techniques improve the performance of deep learning models designed to separate speech, including increasing the accuracy of the deep learning models for independent talker and multi-talker scenarios, decreasing computation time, and providing scalability for scenarios including two or more signal sources. The techniques also improve human-computer interaction by increasing the accuracy of ASR, which enables computing devices to transform human-intelligible speech into machine-readable or machine-executable instructions or signals.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
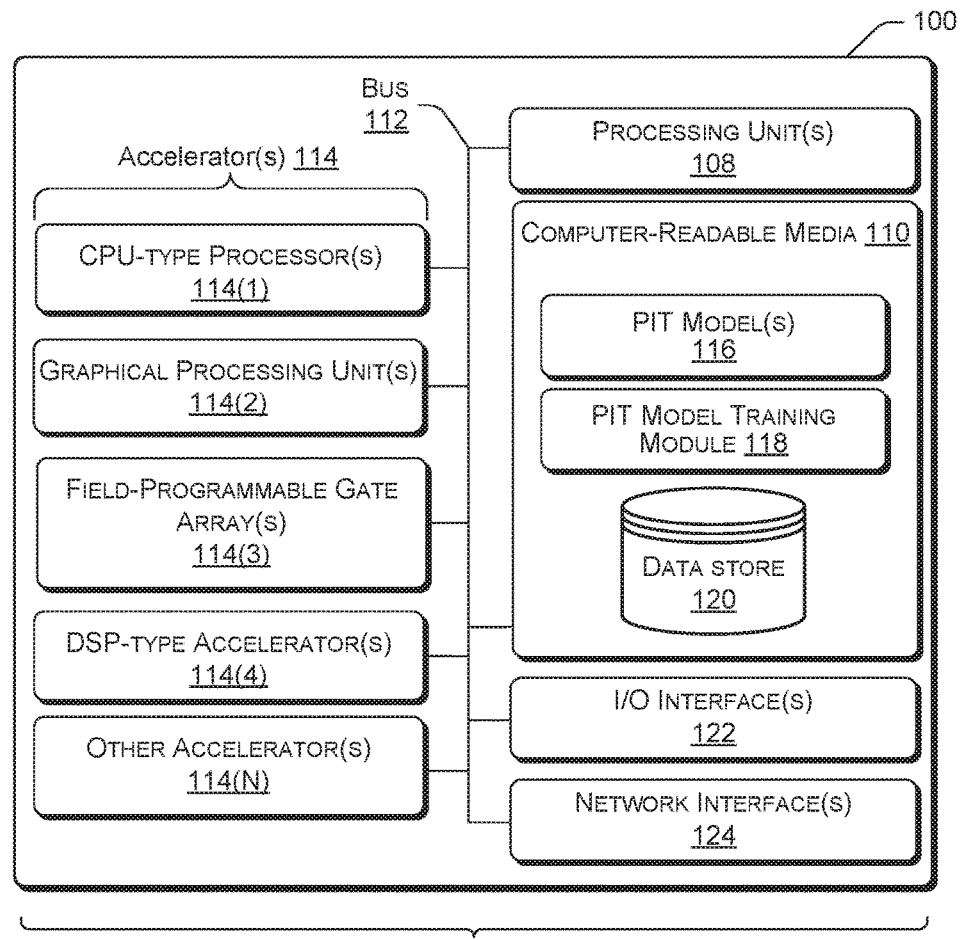
FIG. 1 is a block diagram depicting an example device in which examples of permutation invariant training ("PIT") of deep learning models for talker-independent multi-talker scenarios can operate.
Figure 1:
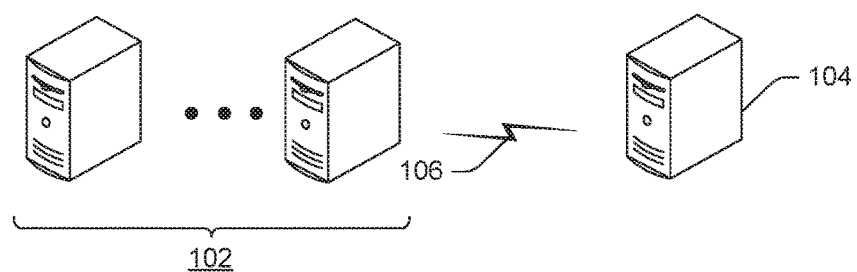

This disclosure can, in some examples, equip a computing device to conduct permutation invariant training ("PIT") of deep learning models for talker-independent multi-talker scenarios. In some examples, the techniques discussed herein can improve a computing device's ability to separate signals from a mixed signal such as, for example, speech signals from among multiple equal or close-to-equal speech signals, which are harder to separate compared to separating a speech signal from a disparate type of audio signals (e.g., speech from music, speech from mechanical noise, speech from general background noise) or from very different speech (e.g., speech within a deep vocal register from speech within a high vocal register). In some examples, the techniques discussed herein can improve the performance of deep learning models designed to separate speech, including increasing the accuracy of the deep learning models for independent talker and multi-talker scenarios, decreasing computation time, and providing scalability for scenarios including two or more signal sources. In some examples, the techniques discussed herein also improve human-computer interaction by increasing the accuracy of automatic speech recognition ("ASR"), which enables computing devices to transform human-intelligible signals into machine-readable or machine-executable instructions and/or signals. The techniques discussed herein also allow ASR to continue to advance, overcoming the halt in advances in ASR caused by inaccurate training data produced by former solutions that inhibited further training of neural networks.

In some examples, the techniques described herein equip a computing device to conduct ASR in talker-independent multi-talker scenarios, which means that the techniques are able to detect and attribute portions of a mixed signal to a talker from among multiple talkers that contribute to the mixed signal, regardless of whether the techniques have previously received data related to the talker before, whether at training or earlier in the evaluation. In other words, the techniques described herein enable ASR for multiple talkers, even when speech overlaps, and even when talkers disappear from or previously-un-encountered talkers appear in the signal. Examples of the scenarios for which a computing device is enabled by the techniques discussed herein include automatic meeting and lecture transcription; automatic captioning for audio/video recordings; multi-party human-machine interactions (e.g., in the world of Internet of things (IoT)), where speech overlapping is commonly observed; etc. It is also important for signal augmentation techniques, such as, for example, smarter hearing aids that can isolate a particular signal from a mix and boost, cut, or otherwise modify that particular signal, signal detection and boosting, live audio production, etc.

The techniques discussed herein overcome drawbacks and limitations of former attempts at solutions. For example, former attempts utilize deep learning models trained on parallel sets of mixtures and their constituent target sources to predict the source belonging to a target class, usually on each time-frequency bin. Former attempts to isolate talkers from multiple talkers are severely limited in that they rely on talker-dependent models by assuming that the talker is known during the training time, which results in a closed set of target speakers at evaluation time and often only works on limited vocabulary and grammar, or they assign labels to frames based on the instantaneous energy of the frame, but this can lead to misidentifying the source if the energy of one signal associated with a first source becomes greater than the energy of a second signal associated with a second source when formerly the second signal had greater energy.

One difficulty in talker-independent multi-talker speech separation arises from the label ambiguity problem (or, equivalently termed, permutation problem). Put simply, even if a deep learning model has the ability to separate signals, there is no effective way to provide a proper label (e.g., a supervision signal) to the corresponding output layers during the training time. Former solutions treated particular model outputs as only pertaining to a specific source, when in reality, signals pertaining to disparate sources may fade in and out of different outputs. In other words, these former solutions treated a first signal estimate output from the solution's system as being attributable to a first signal source, even though that may not be true in some cases, thus stunting the depth at which the neural network can be trained.

Former techniques that seek to solve this problem used only one source of information (e.g., instantaneous energy), were tightly coupled with the decoder, did not easily scale up beyond two talkers, assumed that particular time-frequency bins belonged to only one speaker (which is a fine approximation for image recognition where portions of the image are likely attributable to only one object but in ASR this approximation is very rough), and distinct classification portions of the previous solutions were not jointly trainable, impeding performance of the system.

In some examples, the techniques discussed herein employ permutation invariant training ("PIT", also permutation invariant trained, in some syntactic contexts) of deep learning models for speech separation that functions for independent talkers in a multi-talker signal. In a departure from former solutions that treat speech separation as a multi-class regression, segmentation, or clustering problem, the techniques discussed herein optimize a deep learning model for the separation regression error (i.e., deviation), ignoring the order of mixing sources, in some examples. In other words, the appropriate signal source to which a given output of a neural network can vary, meaning there may be a number of permutations of possible matches between an output of a neural network and the appropriate signal source (i.e., S! possible permutations where S is a number of the signal sources).

In some examples, the techniques discussed herein can first determine an output-target assignment and then minimize the deviation (e.g., error) of the output-target assignment (where "output" refers to a deep learning model's output for an attempt to isolate a particular source signal for a particular "target" source). In some examples, these techniques can be implemented into a neural network's structure itself, solving the label permutation problem that prevented making progress on deep learning based techniques for speech separation. In some examples, the techniques discussed herein can also include source (e.g., talker, noise, etc.) tracing that works together with the PIT deep learning model discussed herein to trace streams originating from a same source through the frames of a mixed signal. The techniques therefore provide permutation invariant training in that they consider and compensate for variations of which signal source is properly attributable for which output of the neural network.

Experimental results indicate that the PIT deep learning model ("PIT model", herein) discussed herein performs very well on talkers unseen by the model in the training model (i.e., the model is "talker independent") even in a difficult setup of a Danish corpus in which equal energy speeches are mixed together. Furthermore, experimental results indicate that the PIT model trained on Danish can separate and also trace English speech sources effectively. During training, similar to humans, the PIT model learned acoustic cues, that are both speaker and language independent, for source separation.

The general terms "deep learning models", "model", and "neural networks" are used interchangeably herein. "PIT model" refers to a permutation-invariant trained model, as described herein. Moreover, although this description uses terms "deep learning models", "model", and "neural networks", it is contemplated that the techniques discussed herein can be used for deep learning models, generative models, classifiers, and/or any other appropriate machine learning techniques.

Detailed Description of the Speech Separation Problem

Although the PIT deep learning model works as well for multi-channel speech, the more difficult problem is monaural speech separation and therefore the discussion herein is directed to monaural speech separation. One skilled in the art will appreciate that the techniques discussed herein can be equally applied to multi-channel speech.

The goal of monaural speech separation is to estimate the individual source signals that are mixed together and overlapping in a monaural signal. Denoting the S source signal sequences in time domain as $x_s(t)$, s=1, ..., S and the mixed signal sequence in time domain as $y(t)=\Sigma_{s=1}^{S} x_s(t)$. The corresponding short time Fourier transformation (STFT) of these signals are $X_s(t, f)$ and $Y(t, f)=\Sigma_{s=1}^{S} X_s(t, f)$, respectively, for each time t and frequency f Given Y(t, f), the goal of monaural speech separation is to recover each source $X_s(t, f)$ (referred to herein equivalently as source signals). In a real application scenario, it can be sufficient, in some examples, to recover the top two or three high-energy source signals. In some examples, more source signals can be recovered. In some examples, as in audio engineering applications, all the source signals can be recovered. Recovering the top two or three source signals may be sufficient in some examples because the remaining sources can be attributed to noise. In many cases, noise is low-energy and therefore, in some cases, an energy or power threshold can be used to determine how many and which source signals to recover.

In some examples, signal recovery by the PIT model can be carried out in the complex spectrum domain when phase information is available. In some examples, signal recovery by the PIT model can be carried out on a magnitude of signal spectrum, meaning the PIT model can operate on magnitude data (e.g., power, energy, amplitude), without phase data and without needing to recover phase data of the source signals. The PIT model can therefore perform signal recovery in less time, with less of a processing burden, with less hardware requirements, and/or with less system components than prior solutions.

In some examples, where no phase information is obtained or available, the magnitude of the mixed spectrum, |Y(t, f)|, does not provide sufficient information to recover magnitudes of the source signals $|X_s(t, f)|$ (referred to herein simply as the source signals or the true source signals when no ambiguity between $X_s(t, f)$ and $|X_s(t, f)|$ is present) seeing as there are an infinite number of possible $|X_s(t,f)|$ combinations that lead to the same mixed spectrum, |Y(t, f)|. In some examples, the PIT system described herein can train a deep learning model by a training set, $\mathbb{S}$, that contains pairs of |Y(t, f)| and $|X_s(t, f)|$, where the deep learning model looks for and learns regularities (e.g., acoustical cues). More specifically, in some examples, the PIT system can train a deep learning model g(·) such that g(f(|Y|); θ)=$|X_s|$, s=1, ..., S, where θ is the model parameters, and f(|Y|) is some feature representation of |Y|. For simplicity and clarity, the discussion hereafter omits and will continue to omit time-frequency indexes.

In some examples, the PIT model can include a deep learning model h(f(|Y|); θ)=$\tilde{M}_s(t,f)$ with the constraint that $\tilde{M}_s(t, f) \geq 0$ and $\Sigma_{s=1}^{S}\tilde{M}_s(t, f)$ for all time-frequency bins (t,f), where $\tilde{M}_s$ is a function that isolates the estimated signal from the mixed signal(e.g., a mask in some examples). In some examples, a softmax operation can be used to satisfy this constraint. In some examples, a hardmax operation can be used to satisfy this constraint. In some examples the masks can be used to estimate $|X_s|$ as $|\tilde{M}_s|=\tilde{M}_s \circ |Y|$, where ○ is the element-wise product of two operands. As referred to herein, $|\tilde{X}_s|$ is referred to herein as "output layers", "estimated signals", "estimated source signals", or "estimates of signals". The term "output layers" can also refer to directly estimated signals, $|X_s|$.

In some examples, the PIT system can optimize the model parameters, θ, to minimize a deviation between an estimated mask, $\tilde{M}_s$, and the ideal mask, $$M_s = \frac{|X_s|}{|Y|}.$$

For example, the PIT system can minimize a mean square error ("MSE") such as:

$$J_m = \frac{1}{T \times F \times S}\sum_{s=1}^{S} \||\tilde{M}_s| - |M_s|\|^2 \qquad (1)$$

In some examples, the PIT system can optimize the model parameters, θ, to minimize an error between estimated source signals, $|\tilde{X}_s|$, and the true source signals, $|X_s|$, for example, according to:

$$J_x = \frac{1}{T \times F \times S} \sum_{s=1}^{S} \left\| |\tilde{X}_s| - |X_s| \right\|^2 \qquad (2)$$

This example permits the silence segment, $|X_s|=0$ to be well-defined, so the accuracy of mask estimation does not affect the training criterion for those segments. In some examples, $J_x$ can be used as the training objective function. In some examples, $J_x$ can be modified to reflect other regression estimators such as, for example, ordinary least squares.

In some examples, the PIT system can use a Dirac delta representation of the source signal and/or estimated signals to trace and/or reconstruct source signal streams. For example, the PIT system can use $\delta X_s(t, f) = X_s(t, f) - X_s(t-m, f-n)$, the delta of the spectrum of an adjacent frame (or adjacent frequency bin), and/or $\delta |X_s(t, f)| = |X_s(t, f)| - |X_s(t-m, f-n)|$, the delta of the spectral magnitude of an adjacent frame (or adjacent frequency bin), where m and n are distance in time and frequency, respectively, and, in some examples, can be either 0 or 1. In some examples, the PIT system can estimate the delta representation of a source signal. In examples where the PIT system estimates the delta representation of a source signal, the PIT system can also estimate the spectrum of the source signal, $X_s$, and/or an estimate of the spectral magnitude of the source signal, $|X_s|$, as discussed herein. In some examples, the PIT system can use the estimated delta signals, together with estimated signals to trace and/or reconstruct the source streams more accurately by minimizing a reconstruction error between a reconstructed delta source signal and the original delta source signal and/or by maximizing likelihood that the estimated delta signal corresponds with the source signal. In some examples, the minimization and/or maximization can be conducted for each meta-frame. In some examples, the minimization and/or maximization can be conducted every N frames and the reconstruction and/or tracing can be conducted based on the minimization and/or maximization for the N frames. In some examples, a delta representation can be extended to any function of $X_s(t, f)$ or $|X_s(t, f)|$, which is often linear.

In some examples, the estimated source signals, $|\tilde{X}_s|$ can be directly integrated with an ASR system. In that case, the PIT system can optimize the model parameters, $\theta$, to minimize the cross entropy between the posterior distribution of senones (e.g., tied-triphone states) or other modeling units (such as triphone, monophone, grapheme, for example) and the target distribution.

Example Device

FIG. 1 is a block diagram depicting select components of an example device 100, which can represent one or more of distributed computing resource(s) 102 and/or computing device 104, or other computing devices implementing some or all of the techniques described herein. In some examples, the example device 100 can include distributed computing resource(s) 102 that can communicate with one another and/or with external devices, such as computing device 104, via one or more networks 106. In at least one example, the distributed computing resource(s) 102 can implement the techniques described herein independently or in parallel. In some examples, a computing device 104 can implement the techniques discussed herein. As such, either the distributed computing resource(s) 102 and/or a computing device 104 can include the PIT system.

Example device 100 can include any type of computing device having one or more processing unit(s) 108 operably connected to computer-readable media 110. The connection may be via a bus 112, which in some examples can include one or more of a system bus, a data bus, an address bus, a PCI bus, a Mini-PCI bus, and any variety of local, peripheral, and/or independent buses, or via another operable connection. Processing unit(s) 108 can represent, for example, microprocessors, controllers or any other suitable type of processors for processing computer executable instructions to control the operation of the device in order to facilitate cross-channel communication. In some examples, where a system on a chip architecture is used, the processing unit(s) 108 can include one or more fixed function blocks (also referred to as accelerators) which implement a part of the method by employing PIT system in hardware (rather than software or firmware).

Example device 100 can include, but is not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, and/or any other sort of computing device such as one or more separate processor device(s), such as central processing unit ("CPU")-type processors (e.g., microprocessors), graphical processing units ("GPUs"), and/or accelerator device(s).

In some examples, distributed computing resource(s) 102 can include one or more computing devices that operate in a cluster and/or other grouped configuration to share resources, balance load, increase performance, provide failover support and/or redundancy, and/or for other purposes. Although illustrated as desktop computers, distributed computing resource(s) 102 and/or computing device 104 can include a diverse variety of device types and are not limited to any particular type of device. For example, distributed computing resource(s) 102 can include any type of computing device having one or more processing unit(s) operably connected to computer-readable media, I/O interfaces(s), and/or network interface(s).

In some examples, network(s) 106 can include public networks such as the Internet, private networks such as an institutional and/or personal intranet, or some combination of private and public networks. Network(s) 106 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 106 can utilize communication protocols, including packet-based and/or datagram-based protocols such as internet protocol (IP), transmission control protocol (TCP), user datagram protocol (UDP), and/or other types of protocols. Moreover, network(s) 106 can also include a number of devices that facilitate network communications and/or form a hardware basis for the networks, such as switches, routers, gateways, access points, firewalls, base stations, repeaters, backbone devices, and the like.

As used herein, the computer-readable media 110 includes two types of computer-readable media, namely computer storage media and communication media. Computer storage media can include volatile and non-volatile, non-transitory machine-readable, removable, and non-removable media implemented in any method or technology for storage of information (in compressed or uncompressed form), such as computer (or other electronic device) readable and/or executable instructions, data structures, program modules, and/or other data to perform processes or methods described herein. Computer storage media includes, but is not limited to hard drives, floppy diskettes, optical disks, CD-ROMs, DVDs, read-only memories (ROMs), random access memories (RAMs), EPROMs, EEPROMs, flash memory, magnetic and/or optical cards, solid-state memory devices, and/or other types of physical machine-readable media suitable for storing electronic instructions.

In contrast, communication media embodies computer-readable instructions, data structures, program modules, and/or other data in a modulated data signal, such as a carrier wave, and/or other transmission mechanism. As defined herein, computer storage media does not include communication media.

In some examples, as shown regarding device 100, computer-readable media 110 can store instructions readable and/or executable by the processing unit(s) 108 and/or accelerator(s) 114. Executable instructions stored on computer-readable media 110 can include, for example, PIT model(s) 116 and/or PIT model training module 118 and other modules, programs, and/or applications that can be loadable and executable by processing units(s) 108 and/or accelerator(s) 114 (e.g., operating systems, firmware).

In some examples, the PIT model(s) 116 and/or the PIT model training module 118 can be implemented as hardware, such as, for example as an integrated circuit or a specially configured processor such as, for example, one or more accelerator(s) 114. In some examples, one or more accelerators 114 can take the place of the processing unit(s) 108 or can be additionally coupled to components of the example device 100 by bus 112. Accelerators 114 can include, for example, CPU-type processor(s) 114(1), GPU(s) 114(2), field-programmable gate array(s) ("FPGA(s)") 114(3), digital signal processing ("DSP")-type accelerator(s) 114(4), and/or other accelerator(s) 114(N). In some examples, the example device 100 discussed herein can configure first processing unit(s) 108 and/or accelerator(s) 114 to perform PIT training and configure second processing unit(s) 108 and/or accelerator(s) 114 to be a PIT model configured as a hardware processor. In some examples, the computer-readable media 110 can be accessible to the accelerator(s) 114 and/or the processing unit(s) 108.

Some or all of computer-executable instructions and/or hardware implementations of the PIT model(s) 116 and/or the PIT model training module 118 can be available to, accessible from, or stored on a remote device and/or distributed computing resource(s) 102, which can be configured as a cloud services system. In some examples, any number of modules could be employed and techniques described herein as employed by one or more modules can be employed by a greater or lesser number of modules. In some examples, the example device 100 can store and/or remotely access, via the network 106, the PIT model(s) 116 and/or PIT model training module 118.

In some examples, the PIT model(s) 116 can include one or more of deep neural networks ("DNNs"), convolutional neural networks ("CNNs"), long short-term memory ("LSTM") recurrent neural networks ("RNNs"), or other suitable deep learning models, the deep learning models having model parameters that determine the output of the models. In some examples, the PIT model(s) 116 can additionally or alternately include one or more of generative models such as a Gaussian mixture model ("GMM"), a hidden Markov model ("HMM"), a Naïve Bayes classifier, etc. In some examples, any appropriate machine learning can be used.

In the illustrated example, computer-readable media 110 can also include a data store 120. In some examples, data store 120 includes data storage such as a database, data warehouse, and/or other type of structured or unstructured data storage. In some examples, data store 120 includes a relational database with one or more tables, indices, stored procedures, and so forth to enable data access. In some examples, the data store 120 can store PIT model(s) 116 and/or training data such as language corpuses that include source signals that can be added together to create an overlapping monaural mixed signal for training the PIT model(s) 116. Data store 120 can store data for the operations of processes, applications, components, and/or modules stored in computer-readable media 110 and/or executed by processor(s) 108, and/or accelerator(s) 114. Alternately, some or all of the above-referenced data can be stored on separate memories such as memories of the distributed computing resource(s) 102, memories of the computing device(s) 104, or a memory on board a CPU-type processor (e.g., microprocessor(s)), memory on board a GPU, memory on board an FPGA type accelerator, memory on board a DSP type accelerator, and/or memory on board another accelerator).

Example device 100 can further include input/output (I/O) interface(s) 122, to allow device 100 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). In some examples, the I/O interface(s) 122 can allow the example device to communicate with one or more microphones (e.g., a microphone array) to capture audio information. The PIT model training module 118 can use this captured audio information to conduct beamforming (i.e., spatial filtering) of the received audio information. This spatially filtered audio data can be used to derive "true source signals" to be used as training data.

Example device 100 can also include network interface(s) 124 to enable communications over network 106. Such network interface(s) 114 may include one or more network interface controllers (NICs) or other types of transceiver devices to send and receive communications over a network 106.

Example Techniques

Figure 2A:
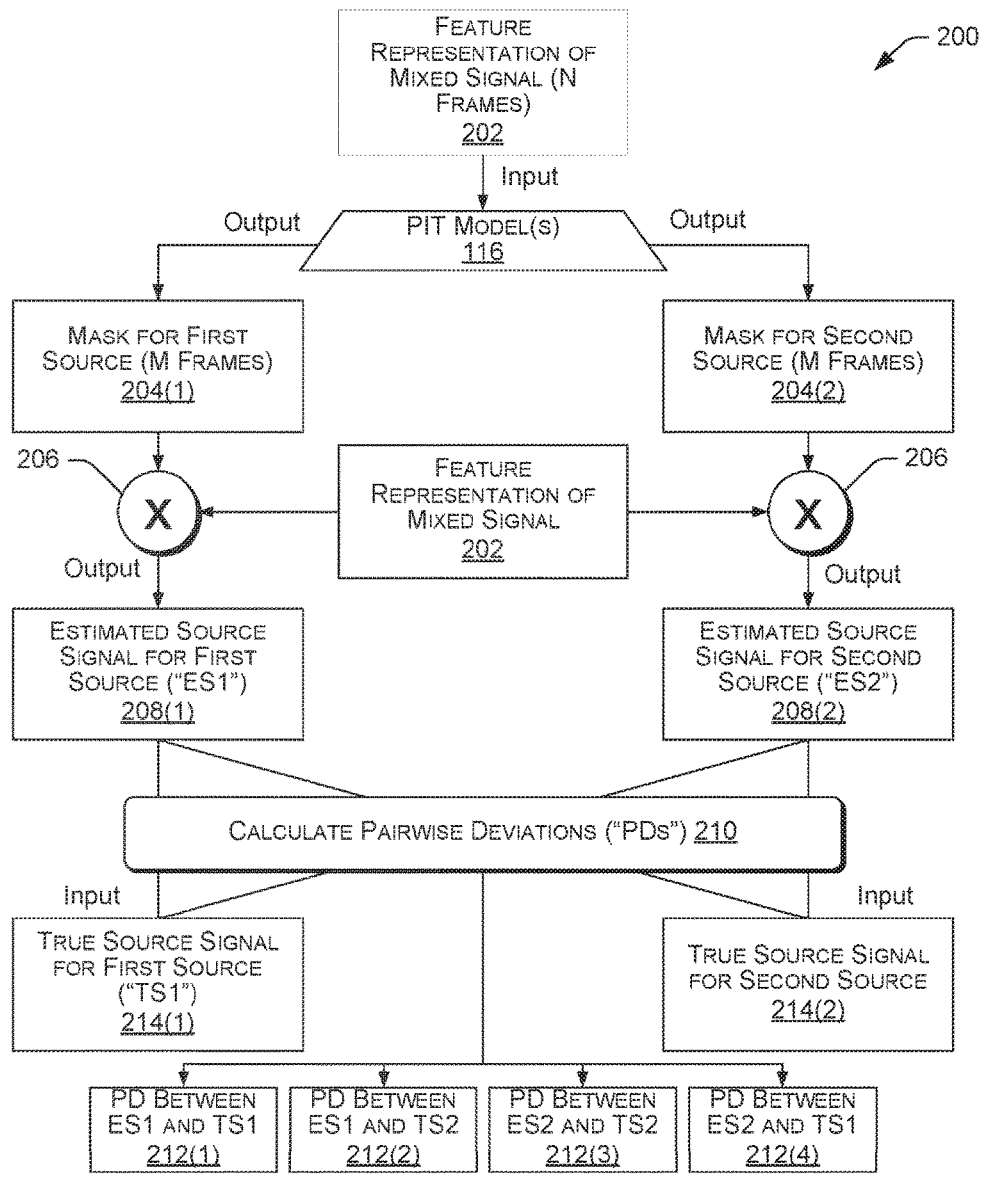
FIGS. 2A and 2B are block diagrams depicting an example system and process for PIT of deep learning models for talker-independent multi-talker scenarios.

FIG. 2A depicts the first portion of an example technique 200 for permutation invariant training. Although FIG. 2A depicts a two-source condition, it will be appreciated from the discussion below that the PIT system and process discussed below can scale to handle more than two sources without prohibitive computation processing or time requirements.

In some examples, a feature representation of the mixed signal (i.e., f(|Y|)) 202 is provided as input to the PIT model(s) 116 (e.g., $g(f(|Y|); \theta) = |X_s|, s=1, \ldots, S$)). In some examples, the feature representation 202 includes N frames (referred to herein as a meta-frame or window, which has a window length of N frames) of feature vectors. In some examples, a frame can include a discrete portion of data such as, for example, a time-frequency bin, a time-frequency index, a discrete amount of time (e.g., 25 milliseconds, 35 milliseconds), or a portion of a spectrum. In some examples, the PIT model(s) 116 can generate one frame of masks for each source (e.g., talker, noise). For example, FIG. 2A illustrates masks 204(1) and 204(2) for isolating signals from a mixed signal. In this example, the frame can be a center frame. In this example, the one frame of masks can be applied to one frame of the mixed signal to isolate (e.g., multiply (206) the mixed signal by the mask(s)) estimated source signals (208(1) and 208(2)), $|\tilde{X}_1(t_1,f_1)|, \ldots, |\tilde{X}_s(t_1,f_1)|$ (where $t_1$, $f_1$ denote the single frame example), from the mixed signal. In some examples, the PIT model(s) 116 can generate multiple frames of masks per source in order to derive the estimated source signals. In some examples, techniques additional or alternative to using a mask to isolate a signal from the mixed signal can be used. In some examples, masks can be used because a model can learn to produce a mask. Other techniques chosen can be trainable as well to benefit from the reliable training data that PIT creates.

The difficulty of the labeling ambiguity problem is knowing which individual true source signal of $|X_1|, \ldots, |X_s|$, corresponds to which individual estimated source signal of $|\tilde{X}_1|, \ldots, |\tilde{X}_s|$. Former solutions have merely corresponded a first (in time or processing) estimated source signal, $|\tilde{X}_2(t_1,f_1)|$, with a first true source signal, $|X_2(t_1,f_1)|$, a second estimated source signal, $|\tilde{X}_2(t_1,f_1)|$, with a second true source signal, $|X_2(t_1,f_1)|$, and calculated a sum of the deviations between $|\tilde{X}_1(t_1,f_1)|$ and $|X_1(t_1,f_1)|$ and 51 $\tilde{X}_2(t_1,f_1)|$ and $|X_2(t_1,f_1)|$. Models can be trained by minimizing this sum of deviations. However, if the training set contains many utterances spoken by many talkers, talkers having similar characteristics, and/or utterances of similar energy, the model generates essentially symmetric estimates and the training is ineffective.

In other examples, models can be trained using permutation invariant training and segment-based decision making. In this example, the true source streams are given as a set instead of an ordered list. In other words, no matter which order is used to list the sources, the same training result is achieved. This behavior is achieved with PIT. The PIT system dynamically associates true source signals to estimated source signals. To accomplish this, in some examples, the PIT system (e.g., the PIT model training module 118 and/or the PIT model(s) 116) can calculate (210) a pairwise measure of deviation (212(1)) between the true source signals (214(1) and 214(2)) $|X_1|, \ldots |X_s|$, and the estimated source signals, $|\tilde{X}_1|, \ldots, |\tilde{X}_s|$ (208(1) and 208(2)). In some examples, the PIT system can compute a pairwise measure of deviation between each true source signal and each estimated source signal (212(1)-(4)). In some examples, the pairwise measure of deviation between the true source signals (214(1) and 214(2)) and the estimated source signals (208(1) and 208(2)) can be a pairwise mean squared error ("MSE"). In some examples, other regression estimators can be used additionally or alternatively to MSE, such as, for example, ordinary least squares. In some examples, the deviation is "pairwise" because the estimated source signals are generated for multiple frames and compared to multiple frames of the true source signal. The example technique 200 is continued in FIG. 2B.

Figure 2B:
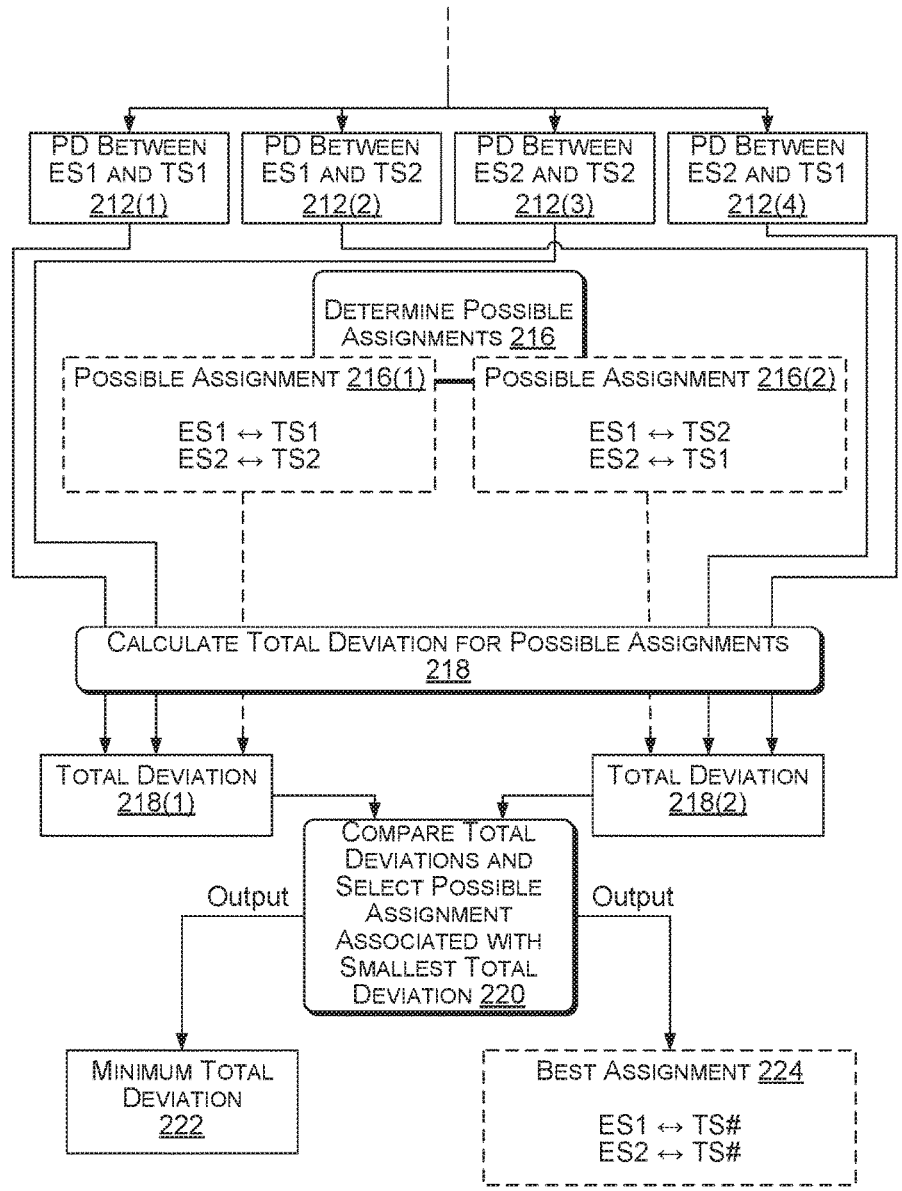

FIG. 2B depicts the second portion of an example technique 200 for permutation invariant training. In some examples, after the PIT system calculates pairwise measures of deviation between the estimated source signals (208(1) and 208(2) and the true source signals (214(1) and (214(2)), the PIT system can then determine (216) the possible assignments (216(1) and 216(2)) between the true source signals (and, by extension, the sources attributable for the source signals) and the estimated sources, and compute (218) the total deviations (218(1) and 218(2)) for the possible assignments. In some examples, these possible assignments are exclusive, meaning only one estimated source signal can be assigned to one true source signal. In some examples, the total number of possible assignments will be S!.

For example, for a two-source condition, the PIT system can calculate pairwise deviations (212(1)-212(4), respectively) between $|\tilde{X}_1|$ and $|X_1|$, $|\tilde{X}_1|$ and $|X_2|$, $|\tilde{X}_2|$ and $|X_2|$, and $|\tilde{X}_2|$ and $|X_1|$, noted $\Delta_{|\tilde{x}_1|\leftrightarrow|x_1|}$, $\Delta_{|\tilde{x}_1|\leftrightarrow|x_2|}$, $\Delta_{|\tilde{x}_2|\leftrightarrow|x_2|}$, and $\Delta_{|\tilde{x}_2|\leftrightarrow|x_1|}$, respectively. For the two-talker condition, there are two possible assignments (or, equivalently, "assignment orders," "label assignments"):$(|\tilde{X}_1|\leftrightarrow|X_1|, |\tilde{X}_2|\leftrightarrow|X_2|)$ (possible assignment 216(1)) and $(\tilde{X}_1|\leftrightarrow|X_2|, |\tilde{X}_2|\leftrightarrow|X_1|)$ (possible assignment 216(2)). In some examples, the PIT system can calculate (218) a total deviation for the possible assignments (218(1) and 218(2)). In this example, the total deviations between individual estimated source signals and the individual true source signals to which the individual source signals are assigned (which depends on the assignment) for the two assignments would be: $\Delta_{(|\tilde{x}_1|\leftrightarrow|x_1|,|\tilde{x}_2|\leftrightarrow|x_2|)} = \Delta_{|\tilde{x}_1|\leftrightarrow|x_1|} + \Delta_{|\tilde{x}_2|\leftrightarrow|x_2|}$ and $\Delta_{(|\tilde{x}_1|\leftrightarrow|x_2|,|\tilde{x}_2|\leftrightarrow|x_1|)} = \Delta_{|\tilde{x}_1|\leftrightarrow|x_2|} + \Delta_{|\tilde{x}_2|\leftrightarrow|x_1|}$, respectively. It will be appreciated by one skilled in the art that this scales with more than two signal sources.

In some examples, the PIT system can identify a number of sources detected, S, in which case the number of possible assignments can be S!. For example, for two sources, there are two possible assignments and for three sources there are six possible assignments.

In some examples, the PIT system compares (220) the total deviations (218(1) and 218(2)) for the possible assignments and selects the possible assignment associated with the smallest total deviation. In some examples, the PIT system uses this selected possible assignment to assign individual estimated source signals to individual true source signals (i.e., the assignment determines which individual estimated source signals are assigned to which individual true source signals). This least total deviation is the minimum total deviation 222 and the possible assignment associated therewith is referred to herein as the permutation-considered assignment 224. In some examples, the PIT system can train the model parameters, θ, of the PIT model(s) 116 to minimize this minimum total deviation 222 (e.g., by the PIT model training module 118). In some examples, the PIT can optimize the model parameters, θ, to minimize a deviation between estimated source signals, $|\tilde{X}_s|$, and the true source signals, $|X_s|$, by using the following equation to develop the training objective function.

$$J_x = \frac{1}{T \times F \times S} \sum_{s=1}^{S} \||\tilde{X}_s| - |X_s|\|^2$$

In some examples, the PIT system can use segment-based decision making. In other words, instead of making the assignment decision based on one frame, such as a center frame, the PIT system can make the decision based on a meta-frame of the feature representation 202. In this example, the PIT model(s) 116 can use N frames (i.e., a meta-frame, window) of a feature representation 202 of the mixed signal for each shift of frame as input to the PIT model(s) 116 to generate masks of M>1 frames of the separated speech (i.e., the estimated source signals) for each meta-frame of input so that the assignment decision is made on a segment instead of one frame of reconstructed speech. This allows contextual information to be exploited for tracing and for more accurate assignments according to the technique discussed above. Estimating source signals for multiple frames of the separated speech also allows the PIT system to trace a signal attributable to a certain source throughout the mixed signal. In some examples, the meta-frame window can be shifted by one frame per iteration for a streamed mixed speech signal. In other examples, other frame shift rates can be used depending on accuracy and computation time constraints. In this example, the deviation measure calculated between the estimated source signals and the true source signals is calculated for M>1 frames of the estimated source signals and the true source signals.

In some examples, the only information available is the mixed speech, such as during inference. In some examples, speech separation can be directly carried out for each meta-frame of input, for which a meta-frame with M frames of a source signal is estimated for each stream. Note that "meta-frame" and "window" are used interchangeably herein and both refer to a unit of a discrete number of frames. In some examples, the window of input is then shifted by one (or more) frames. In some examples, the shift rate can be chosen so that a shifted window overlaps a last window by at least two frames. In some examples, more than two frames should overlap to provide further contextual information. When the output of adjacent input windows has overlapping frames, the PIT system can trace signals attributable to respective sources at least in part by minimizing the overall (across the whole utterance) deviation (e.g., an MSE) of the overlapping frames. In some examples, another model(s) (e.g., DNN/CNN/LSTM, or even generative models, such as a GMM or HMM) can be trained to cluster the estimated source signals to correct streams. In some examples, the delta signals can be exploited to aid tracing and/or reconstruction.

In some examples, tracing a talker can be based, at least in part, on the MSE between signal data of overlapping frames. In these examples, the PIT system can optimize the reconstruction deviation, as discussed above, and/or the MSE between a subset (e.g., the center) of the overlapped frames, under the multi-task optimization framework. In some examples, the true source signals, $|X_s|$, are available to the PIT system during evaluation (e.g., retrieved from storage, obtained from spatially filtered signals obtained by spatially filtering signals captured by a microphone and/or microphone array) and from which the permutation-considered assignment can be estimated by the PIT model(s) 116. In some examples, the PIT system can use the permutation-considered assignments assigned to frames or meta-frames to trace a source stream. In some examples, the PIT system can trace the source stream by obtaining the permutation-considered assignment for each frame or for frames spaced by a frame spacing rate or by obtaining the permutation-considered assignment for each meta-frame or meta-frames spaced from each other by a meta-frame spacing rate. In a two-source example, an output one, $O_1$, can be assigned to the true source signal one, $|X_1|$, and output two, $O_2$, can be assigned to the true source signal two, $|X_2|$ for a first assignment order and the reverse for a second assignment order. In some examples where more than two source signals are produced, a table of the permutation-considered assignments can be maintained to associate the appropriate outputs and sources accordingly.

In some examples, once the relationship between the outputs and source streams are determined for each meta-frame, the separated speech can be estimated, taking into account the permutation-considered assignments for as many meta-frames as separated speech is desired (e.g., all the meta-frames in some examples). For example, the separated speech for a source can be estimated by exploiting all the frames attributed to that source according to the permutation-considered assignments for the frames. In some examples this means that the frames of the separated speech are estimated by smoothing frames of one or more meta-frames, depending on the permutation-considered assignments for the respective frames. In some examples, the permutation-considered assignment can be determined using total deviations of adjacent output meta-frames. In some examples, the permutation-considered assignment can be determined using total deviations of adjacent output meta-frames and a similarity score of an embedding of estimated source signals. In some examples, the embedding is calculated between adjacent output meta-frames. In some examples, the similarity score can include a cosine distance between content of the meta-frames. In some examples, other distance metrics can be used to determine the similarity score.

In some examples, to accomplish this, the PIT system can select a center frame from the available meta-frames that corresponds to a same source. In some examples, the PIT system can directly stitch the output of the meta-frames as the estimates and permutation-considered assignments are generated. Since the same frame is contained in M meta-frames, in an example where the meta-frames are shifted by one frame per iteration, the PIT system can average over meta-frames to attain the separated speech. In these examples, the PIT system can weight the average based at least in part on the distance of the frame-of-interest to the center frame of each meta-frame for which the frame-of-interest is evaluated (i.e., the M meta-frames).

Figure 3A:
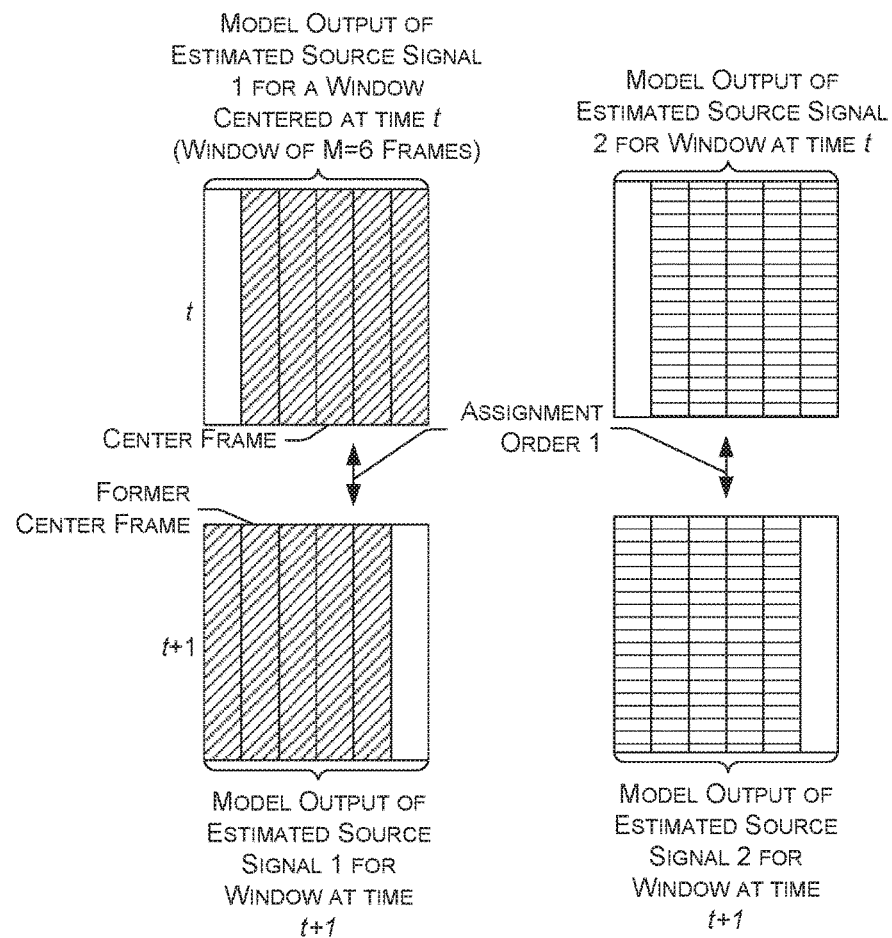
FIGS. 3A and 3B depict assignment orders for a two-source case with a frame shift of one.

FIG. 3A depicts a first frame assignment order for an example scenario with two signal sources where the PIT model(s) 116 produces estimated source signals with a frame shift of 1 (e.g., producing estimates for a window of frames according to any of the techniques discussed above). In some examples, these assignments can be used to stitch the output of the meta-frames. Note that five of the frames composing the windows of the estimated sources signals are shaded to denote the frames that would overlap between iterations of estimations by the PIT model(s) 116 when the frame shift rate is 1. The alternate forms of shading denote disparate data.

Figure 3B:
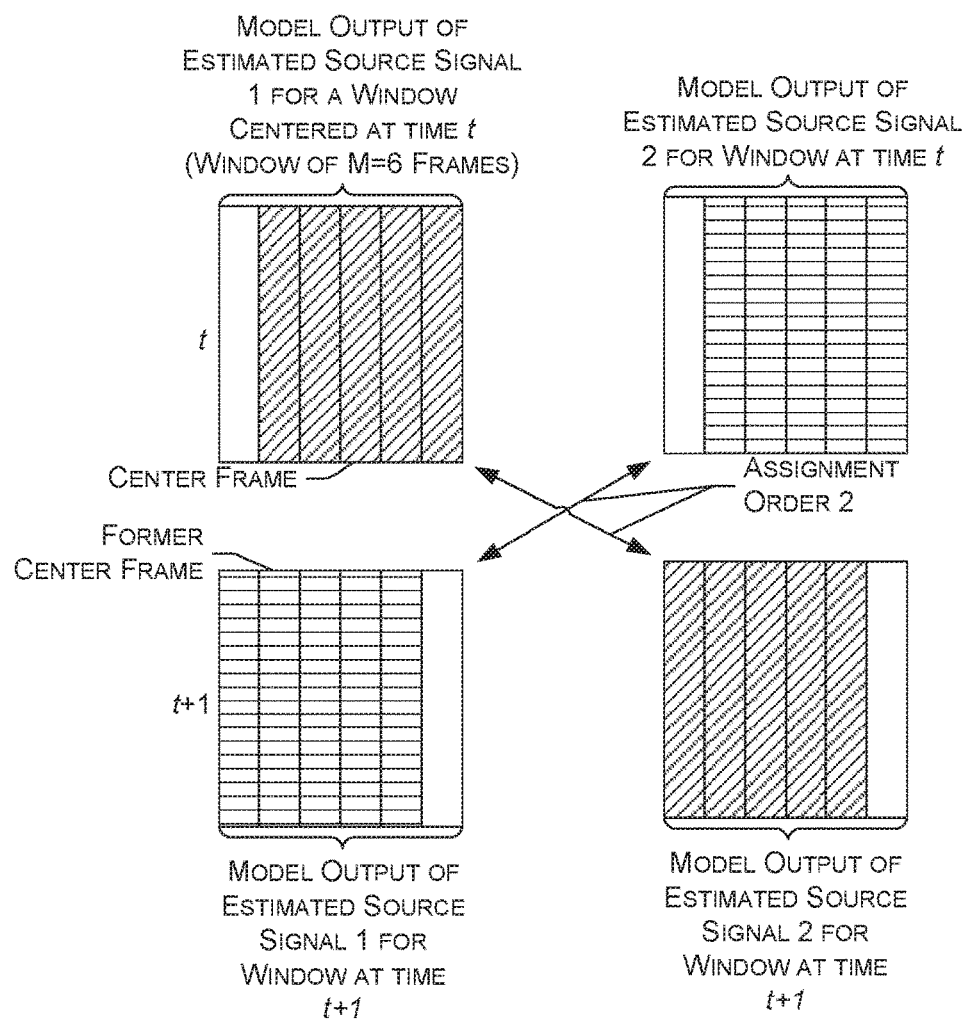

FIG. 3B depicts a second frame assignment order for an example scenario with two signal sources where the PIT model(s) 116 produces estimated source signals with a frame shift of 1 according to any of the techniques discussed above. In some examples, these assignments can be used to stitch the output of the meta-frames. This second frame assignment order helps illustrate the pitfall of former solutions. Former solutions would label output 1 as corresponding to source 1 for both time t and time t+1, even though that label assignment is inaccurate at time t+1 since the output 1 of the model at time t+1 should be assigned to source 2 according to the techniques discussed herein. Note that five of the frames composing the windows of the estimated sources signals are shaded to denote the frames that would overlap between iterations of estimations by the PIT model(s) 116 when the frame shift rate is 1. The alternate forms of shading denote disparate data.

Example Processes

FIGS. 4A-8 illustrate example processes 400, 500, 600, 700, and 800 respectively, which can be performed in whole or in part. These processes can, but need not be, performed by the example device 100 of FIG. 1 and/or in or part of the scenario 200.

Figure 4A:
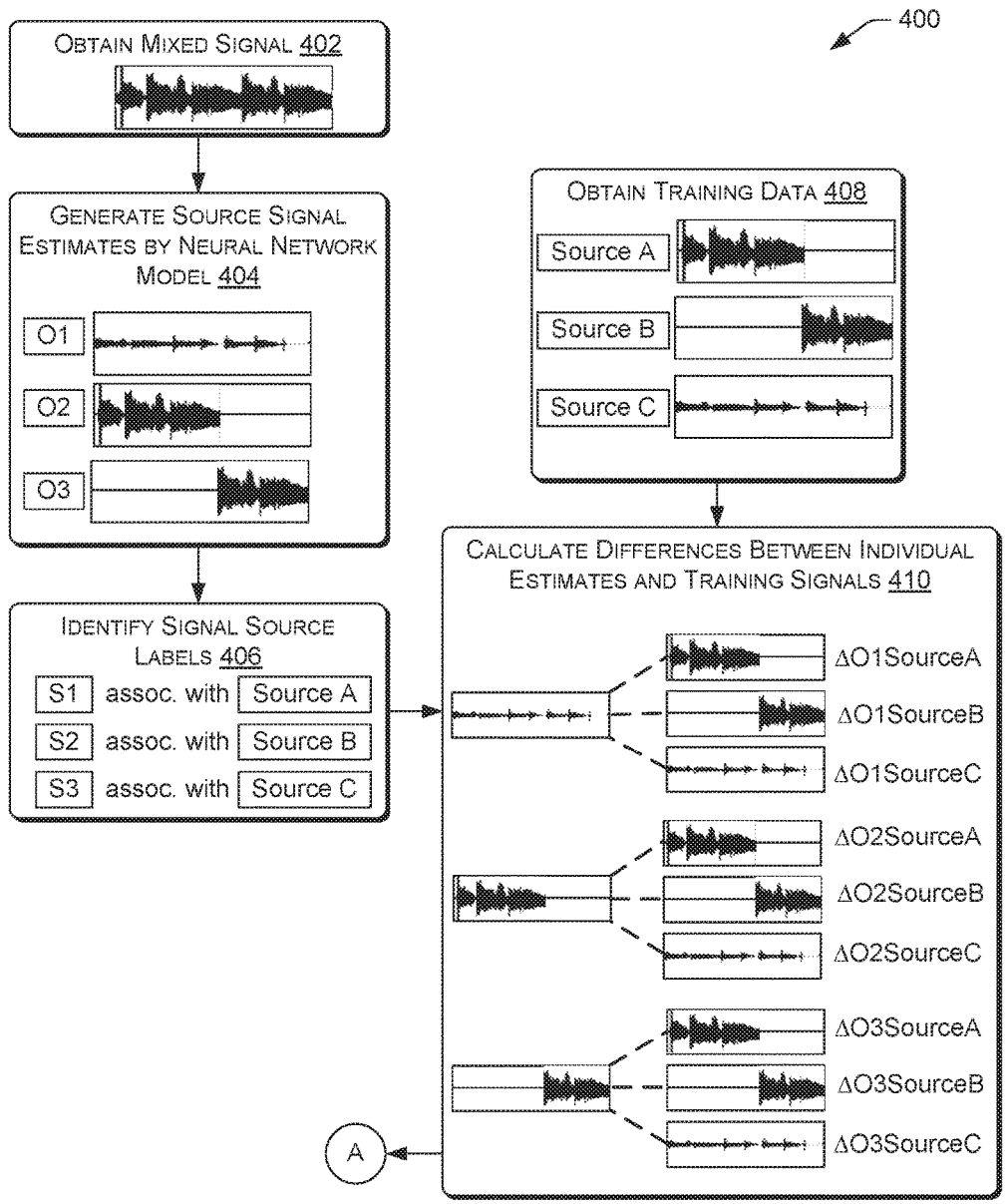
FIG. 4A and FIG. 4B are flow diagrams illustrating an example process to conduct PIT of a neural network.
Figure 4B:
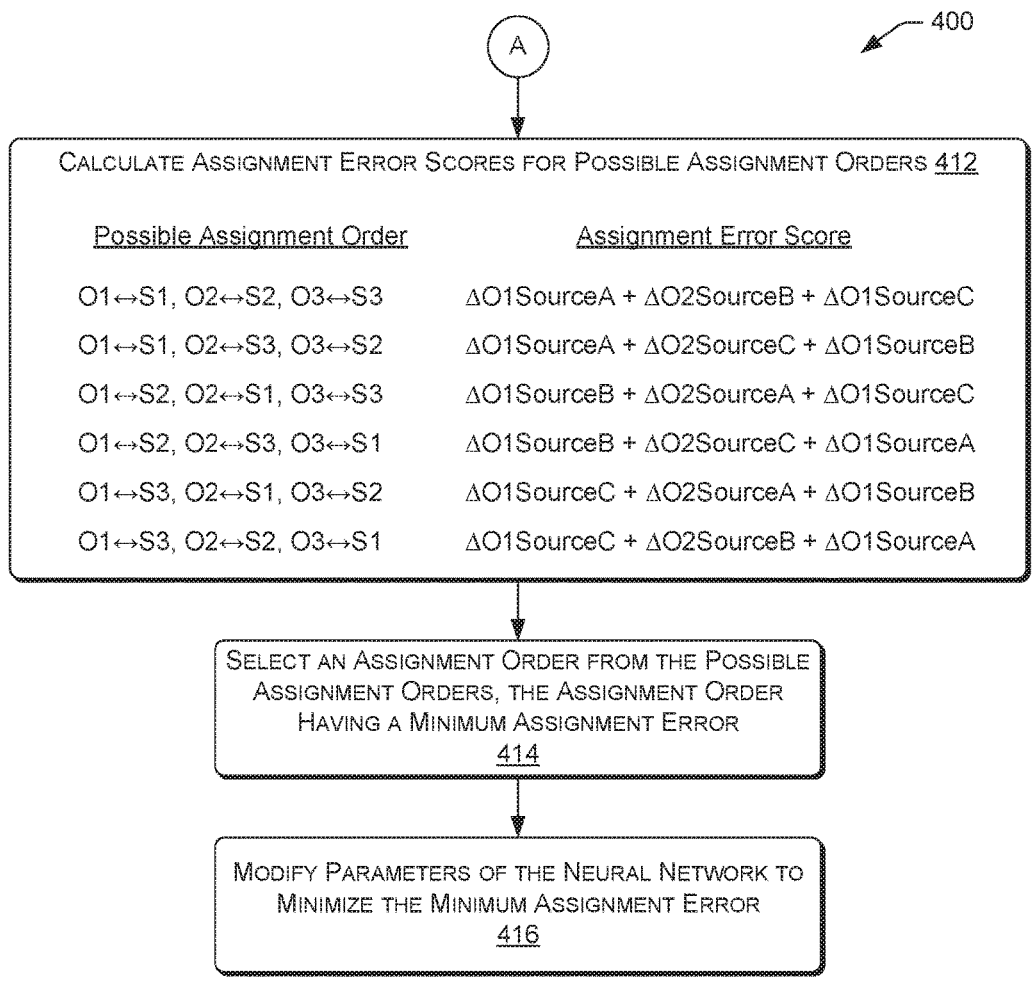

FIG. 4A and FIG. 4B depicts an illustrative process 400 of conducting PIT of a neural network such as PIT model(s) 116.

At 402, the PIT system obtains a mixed signal, according to any of the techniques discussed herein. In some examples, the PIT system can retrieve the mixed signal from the computer-readable media 110 or from a remote device, or the PIT system can capture the mixed signal via a microphone or other I/O device via I/O interface(s) 122.

At 404, a neural network, such as PIT model(s) 116, generates source signal estimates, according to any of the techniques discussed herein.

At 406, the PIT system identifies signal source labels, according to any of the techniques discussed herein. In some examples, this is a trivial step. In some examples, the labels correspond to a number of the estimated source signals. In some examples, identifying the signal source labels can include identifying a number of the source signals. In some examples, identifying the signal source labels can include identifying a number of "talker" labels and a number of "noise" labels, the two numbers additively equaling the number of estimated source signals.

At 408, the PIT system obtains training data according to any of the techniques discussed herein. For example, the training data can include a spatially filtered signal and/or true source signals. In some examples, the PIT system can obtain a spatially filtered signal from a microphone array via the I/O interface(s) 112 or from computer-readable media 110.

At 410, the PIT system calculates deviations between individual estimates and training signals (e.g., true source signals) according to any of the techniques discussed herein. For example, these deviations can be an error (e.g., a distance) between the estimated signals and the true signals.

At 412, the PIT system calculates total deviation scores for possible assignment orders according to any of the techniques discussed herein (e.g., from the calculated deviations).

At 414, the PIT system selects an assignment order from the possible assignment orders based at least in part on the selected assignment order being associated with a minimum total deviation. In some examples, deviations can be calculated between the individual estimated source signals and the individual true source signals to which the individual estimated source signals are assigned and the deviations can be totaled for the different possible assignment orders.

At 416, the PIT system modifies parameters of the neural network to minimize the minimum total deviation (e.g., the PIT system trains the neural network with a training objective of minimizing the total deviation).

Figure 5:
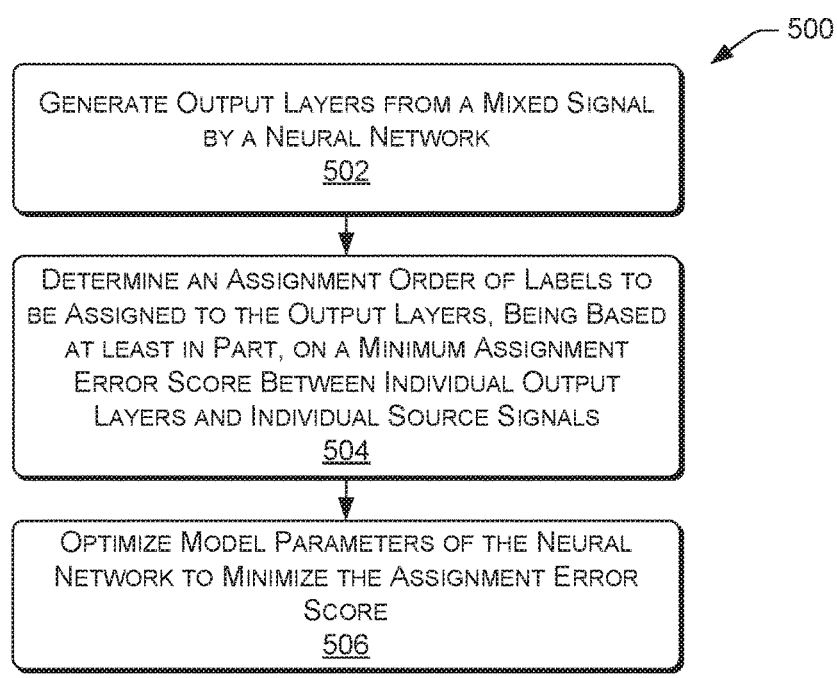
FIG. 5 is a flow diagram illustrating an example process to conduct PIT of a neural network.

FIG. 5 depicts an illustrative process 500 of conducting PIT of a neural network such as PIT model(s) 116.

At 502, the PIT system generates, by a neural network, output layers from the mixed signal, the output layers being an estimate of the source signals, according to any of the techniques discussed herein.

At 504, the PIT system determines an assignment order of labels to be assigned to the output layers, individual labels being associated with individual source signals and the assignment order being based, at least in part, on a minimum total deviation score between individual output layers and individual source signals, according to any of the techniques discussed herein.

At 506, the PIT system optimizes model parameters of the neural network to minimize the total deviation score, according to any of the techniques discussed herein.

Figure 6:
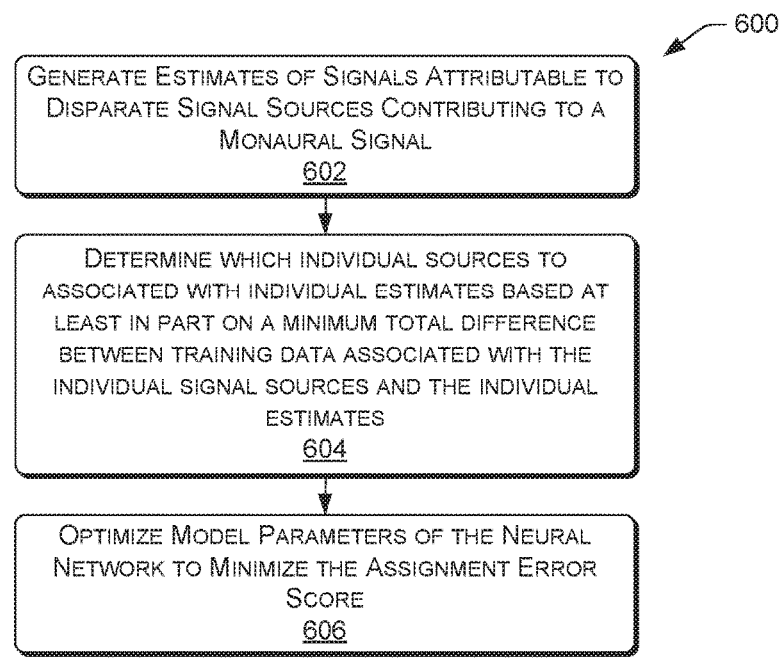
FIG. 6 is a flow diagram illustrating an example process to conduct PIT of a neural network.

FIG. 6 depicts an illustrative process 600 of conducting PIT of a neural network such as PIT model(s) 116.

At 602, the PIT system generates, by a neural network and from a window of frames of a monaural signal, estimates of signals attributable to disparate signal sources contributing to the monaural signal, according to any of the techniques discussed herein.

At 604, the PIT system determines which individual signal sources to associate with individual estimates based at least in part on a minimum total deviation between training data associated with the individual signal sources and the individual estimates, according to any of the techniques discussed herein.

At 606, the PIT system modifies parameters of the neural network to reduce the minimum total deviation, according to any of the techniques discussed herein.

Figure 7:
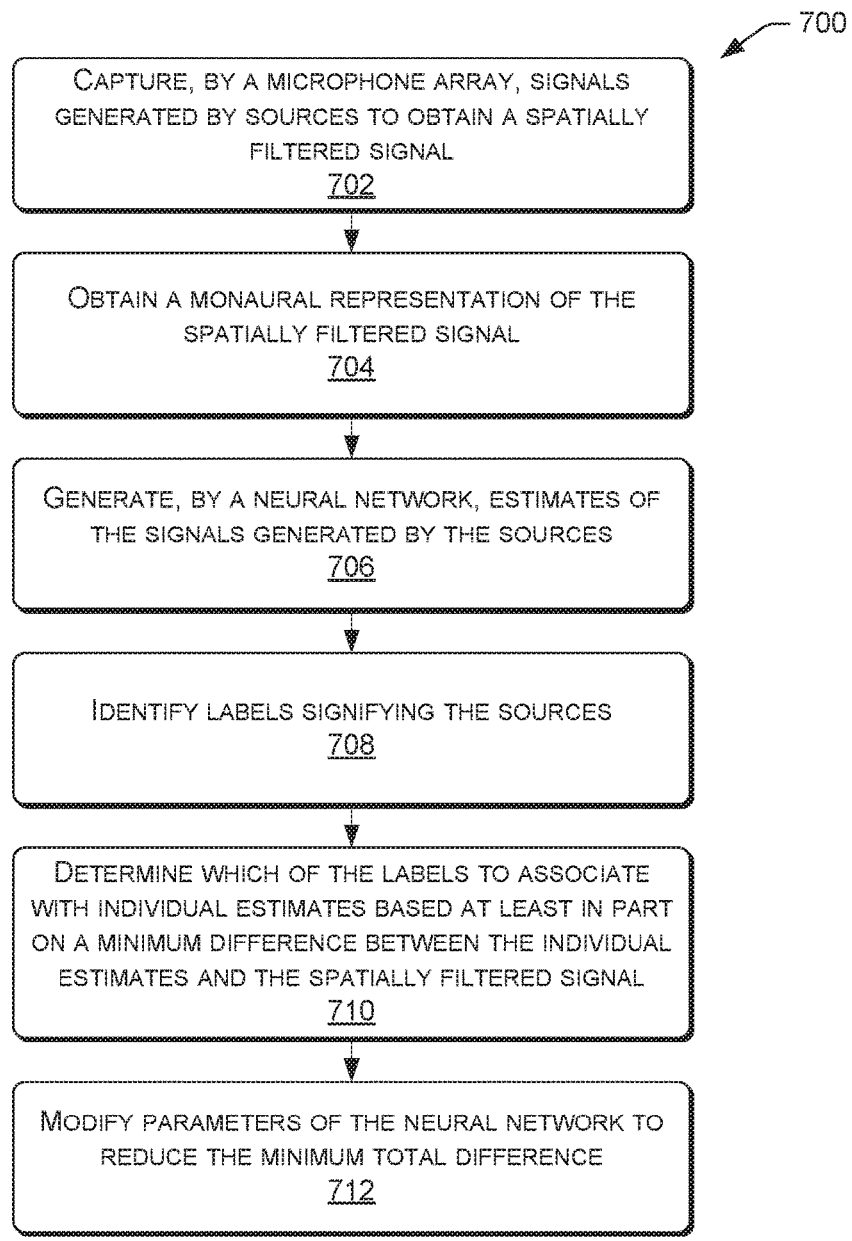
FIG. 7 is a flow diagram illustrating an example process to conduct PIT of a neural network.

FIG. 7 depicts an illustrative process 700 of conducting PIT of a neural network such as PIT model(s) 116.

At 702, the PIT system captures, by the microphone array, signals generated by sources to obtain a spatially filtered signal, according to any of the techniques discussed herein.

At 704, the PIT system obtains a monaural representation of the spatially filtered signal, according to any of the techniques discussed herein.

At 706, the PIT system generates, by the neural network and from a window of frames of the monaural signal, estimates of the signals generated by the sources, according to any of the techniques discussed herein.

At 708, the PIT system identifies labels signifying the sources, according to any of the techniques discussed herein.

At 710, the PIT system determines which of the labels to associate with individual estimates based at least in part on a minimum deviation between the individual estimates and the spatially filtered signal, according to any of the techniques discussed herein.

At 712, the PIT system modifies parameters of the neural network to reduce the minimum total deviation, according to any of the techniques discussed herein.

Figure 8:
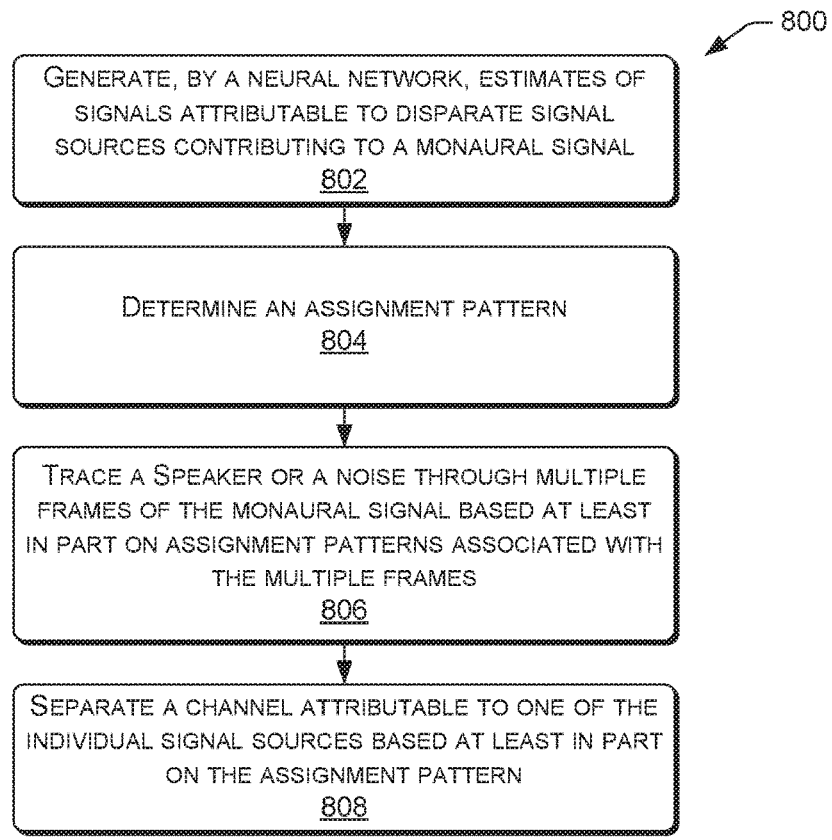
FIG. 8 is a flow diagram illustrating an example process to conduct PIT speech separation.

FIG. 8 depicts an illustrative process 800 of conducting PIT speech separation.

At 802, the PIT system generates, by the neural network and from a window of frames of a monaural signal, estimates of signals attributable to disparate signal sources contributing to the monaural signal, according to any of the techniques discussed herein.

At 804, the PIT system determines an assignment pattern, the assignment pattern defining which individual signal sources are associated with individual estimates based at least in part on a minimum total deviation between training data associated with the individual signal sources and the individual estimates, according to any of the techniques discussed herein.

At 808, the PIT system separates a channel attributable to one of the individual signal sources based at least in part on the assignment pattern, according to any of the techniques discussed herein At 806 the PIT system traces a speaker or a noise through multiple frames of the monaural signal based at least in part on assignment patterns associated with the multiple frames, according to any of the techniques discussed herein.

Example Clauses

A. A method of training a model for separating source signals from a mixed signal comprising: generating, by the model, output layers from the mixed signal, the output layers being estimates of the source signals; determining an assignment order of labels to be assigned to the output layers, individual labels being associated with individual source signals and the assignment order being based, at least in part, on a minimum total deviation score between individual output layers and individual source signals; and optimizing model parameters of the model to minimize the total deviation score of the determined assignment order.

B. A method as paragraph A recites, wherein determining the assignment order of the labels includes: calculating a set of pairwise deviations between the individual output layers and the source signals; calculating total deviation scores for possible assignment orders, a total deviation score for a possible assignment order including a summation of the pairwise deviations between respective pairs of the individual output layers and the individual source signals to which the individual output layers correspond according to the possible assignment order; and selecting, from the possible assignment orders, the assignment order based at least in part on a total deviation score associated with the assignment order being a minimum total deviation score among the total deviation scores.

C. A method as either paragraph B or C recites, wherein the pairwise deviations include a means squared error between an individual output layer and one or more of the source signals.

D. A method as any one of paragraphs A-C recites, the total deviation scores for an assignment order including a total mean squared error between the individual output sources and the individual source signals with which the individual output sources are associated according to the assignment order.

E. A method as any one of paragraphs A-D recites, wherein the pairwise deviations are calculated for two or more frames of the individual output layer and two or more frames of the source signals.

F. A method as any one of paragraphs A-E recites, wherein assigning an individual label to an individual output layer attributes the output layer to a source of an individual source signal of the source signals.

G. A method as any one of paragraphs A-F recites, wherein the model obtains the output layers using two or more frames of the mixed signal or two or more frames of a feature signal of the mixed signal.

H. A method as any one of paragraphs A-G recites, further comprising: shifting a current window of the mixed signal by one or more frames to obtain an adjacent window, wherein the adjacent window and the current window have overlapping frames; and selecting an assignment order for the adjacent window based at least in part on the assignment order being associated with a minimum total deviation score.

I. A method as any one of paragraphs A-H recites, further comprising: selecting assignment orders for multiple windows of the mixed signal, output layers, and source signals; recording the assignment orders for the multiple windows; and tracing, based at least in part on record of assignment orders for the multiple windows, a source signal attributable to a signal-creating source through multiple frames of the mixed signal.

J. A method as any one of paragraphs A-I recites, wherein tracing the source signal attributable to a signal-creating source includes: identifying a subset of frames of the multiple frames of the mixed signal that are included in windows having center frames associated with the source signal by respective assignment orders.

K. A method as any one of paragraphs A-J recites, further comprising: obtaining a first minimum total deviation associated with a first meta-frame of the output layers; obtaining a second minimum total deviation associated with a second meta-frame of the output layers; calculating a similarity score of an embedding of the output layers; and determining an assignment order for the first meta-frame or a center frame of the first meta-frame based at least in part on the first minimum total deviation or the second minimum total deviation and the similarity score.

L. A method as any one of paragraphs A-K recites, the output layers including: an estimate of a delta representation of a source signal, and one or more of an estimate of a spectral magnitude of the source signal or an estimate of a spectrum of the source signal; and the method as paragraph A recites, further comprising: tracing, based at least in part on the estimate of the delta representation, a source attributable for the source signal through multiple frames of the mixed signal.

M. A method as any one of paragraphs A-L recites, further comprising: estimating separated source signals based at least in part on assignment orders for multiple frames of the mixed signal, output layers, and source signals, wherein estimating includes: for a signal source attributable to a first signal of the source signals, identifying a subset of frames of the multiple frames associated with the first signal, based on the respective permutation-considered assignment orders of the subset of frames; and associating the subset of frames with the signal source to obtain a separated signal source attributable to a source of the first signal.

N. A method as any one of paragraphs A-M recites, further comprising: spatially filtering, by a microphone array, the mixed signal to obtain the signal sources and to identify the signal-creating sources; and jointly optimizing the model based at least in part on the spatially filtered signal sources.

O. A system comprising: one or more processors; a model; a memory having stored thereon computer-executable instructions that, when executed by the one or more processors, configure the processors to: generate, by the model and from a window of frames of a monaural signal, estimates of signals attributable to disparate signal sources contributing to the monaural signal; determine which individual signal sources to associate with individual estimates based at least in part on a minimum total deviation between training data associated with the individual signal sources and the individual estimates; and modify parameters of the model to reduce the minimum total deviation.

P. A system as paragraph O recites, wherein at least one of the one or more processors is a specialized processing unit including one or more of: a graphics processing unit; or an integrated circuit; and wherein the specialized processing unit is configured as the model to generate the estimates of signals.

Q. A system as either paragraph O or P recites, the processors further configured to: shift a current window of the mixed signal by one or more frames to obtain an adjacent window, wherein the adjacent window and the current window have overlapping frames; and select an assignment order for the adjacent window based at least in part on the assignment order being associated with a minimum total error score or a similarity score for overlapping portions of the adjacent window and the current window.

R. A system as any one of paragraphs O-Q recites, the processors further configured to estimate separated source signals based at least in part on assignment orders for the current window and the adjacent window.

S. A method comprising: generating, by a model and from a window of frames of a monaural signal, estimates of signals attributable to disparate signal sources contributing to the monaural signal; determining an assignment pattern for the estimates, the assignment pattern defining which individual signal sources are associated with which individual estimates based at least in part on a minimum total pairwise deviation between training data associated with the individual signal sources and the individual estimates; and separating a channel attributable to one of the individual signal sources based at least in part on the assignment pattern.

T. A method as paragraph S recites further comprising: tracing a speaker or a noise through multiple frames of the monaural signal based at least in part on assignment patterns associated with the multiple frames.

U. A method as either paragraph S or T recites further comprising: modifying parameters of the model to reduce the minimum total pairwise deviation between the training data and the estimates.

V. A method as any one of paragraphs S-U recites, wherein separating the channel attributable to one of the individual signal sources includes: identifying a subset of frames of the monaural signal that correspond with the one of the individual signal sources, the subset of frames including frames associated with an average assignment over windows containing the frames that corresponds with the one of the individual signal sources; and associating the subset of frames with the one of the individual signal sources to obtain the channel attributable to the one of the individual signal sources.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The modules described herein represent instructions that can be stored in any type of computer-readable medium and can be implemented in software and/or hardware. All of the methods and processes described above can be embodied in, and fully automated via, software code modules and/or computer-executable instructions executed by one or more computers or processors, hardware, or some combination thereof. Some or all of the methods can alternatively be embodied in specialized computer hardware.

Conditional language such as, among others, "can," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or any combination thereof. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A method of separating two or more audio source signals from a first mixed signal having audio source signals and noise source signals, the method comprising:
generating output layers from a second mixed signal, the output layers being estimates of audio source signals in the second mixed signal;
generating a plurality of labels, wherein a total number of the plurality of labels is equal to a total number of the output layers;
iteratively assigning the plurality of labels to the output layers for possible combinations of labels and output layers to create a set of possible assignments, each possible assignment in the set of possible assignments corresponding to a combination of labels and output layers;
obtaining a plurality of spatially filtered signals, wherein a total number of spatially filtered signals is equal to the total number of the plurality of labels;
determining assignment error scores for each of the set of possible assignments, the assignment error scores determined based at least in part on a difference between labels of the plurality of labels for respective output layers for a respective possible assignment and the plurality of spatially filtered signals;
determining an assignment order of labels to be assigned to the output layers, individual labels being associated with individual audio source signals and the assignment order being based, at least in part, on a minimum total deviation score between individual output layers and the individual audio source signals, wherein the minimum total deviation score is a lowest assignment error score of the assignment error scores;
generating a set of masks by iteratively optimizing model parameters of the model to minimize the minimum total deviation score of the determined assignment order; and
generating the two or more audio source signals from the first mixed signal by using the set of masks, the source of the two or more audio source signals being different from a source of the audio source signals in the second mixed signal.

2. A method as claim 1 recites, wherein determining the assignment order of the labels includes:
calculating a set of pairwise deviations between the individual output layers and the audio source signals;
calculating total deviation scores for possible assignment orders, a total deviation score for a possible assignment order including a summation of the pairwise deviations between respective pairs of the individual output layers and the individual audio source signals to which the individual output layers correspond according to the possible assignment order; and selecting, from the possible assignment orders, the assignment order based at least in part on a total deviation score associated with the assignment order being a minimum total deviation score among the total deviation scores.

3. A method as claim 2 recites, the total deviation scores for an assignment order including a total mean squared error between individual output sources and the individual audio source signals with which the individual output audio sources are associated according to the assignment order.

4. A method as claim 1 recites, wherein assigning an individual label to an individual output layer attributes the individual output layer to a source of an individual audio source signal of the audio source signals.

5. A method as claim 1 recites, wherein the model obtains the output layers using two or more frames of the mixed signal or two or more frames of a feature signal of the second mixed signal.

6. A method as claim 1 recites, further comprising:
shifting a current window of the second mixed signal by one or more frames to obtain an adjacent window, wherein the adjacent window and the current window have overlapping frames; and
selecting an assignment order for the adjacent window based at least in part on the assignment order being associated with a minimum total deviation score.

7. A method as claim 1 recites, further comprising:
selecting assignment orders for multiple windows of the second mixed signal, output layers, and audio source signals;
recording the assignment orders for the multiple windows; and
tracing, based at least in part on record of assignment orders for the multiple windows, a source signal attributable to a signal-creating audio source through multiple frames of the second mixed signal.

8. A method as claim 7 recites, wherein tracing the audio source signal attributable to a signal-creating audio source includes:
identifying a subset of frames of the multiple frames of the second mixed signal that are included in windows having center frames associated with the audio source signal by respective assignment orders.

9. A method as claim 8 recites, further comprising:
obtaining a first minimum total deviation associated with a first meta-frame of the output layers;
obtaining a second minimum total deviation associated with a second meta-frame of the output layers;
calculating a similarity score of an embedding of the output layers; and
determining an assignment order for the first meta-frame or a center frame of the first meta-frame based at least in part on the first minimum total deviation or the second minimum total deviation and the similarity score.

10. A method as claim 1 recites, the output layers including:
an estimate of a delta representation of a source signal, and;
one or more of an estimate of a spectral magnitude of the source signal or an estimate of a spectrum of the source signal; and the method as claim 1 recites, further comprising:
tracing, based at least in part on the estimate of the delta representation, a source attributable for the source signal through multiple frames of the second mixed signal.

11. A method as claim 1 recites, further comprising:
estimating separated audio source signals based at least in part on assignment orders for multiple frames of the second mixed signal, output layers, and audio source signals, wherein estimating includes:
for a signal source attributable to a first signal of the audio source signals, identifying a subset of frames of the multiple frames associated with the first signal, based on the respective permutation-considered assignment orders of the subset of frames; and
associating the subset of frames with the signal audio source to obtain a separated signal audio source attributable to a source of the first audio signal.

12. A method as claim 1 recites, further comprising:
spatially filtering, by a microphone array, the mixed signal to obtain the audio signal sources and to identify the signal-creating audio sources; and
jointly optimizing the model based at least in part on the spatially filtered audio signal sources.

13. A system for separating two or more audio source signals from a first monaural signal having audio source signals and noise source signals, the system comprising:
one or more processors; and
a memory having stored thereon computer-executable instructions that, when executed by the one or more processors, configure the processors to:
generate, from a window of frames of a second monaural signal, output layers comprising estimates of audio source signals attributable to disparate audio signal sources contributing to the second monaural signal;
generate a plurality of labels, wherein a total number of the plurality of labels is equal to a total number of the disparate audio signal sources;
iteratively assign the plurality of labels to the disparate audio signal sources for all possible combinations of labels and disparate audio signal sources to create a set of possible assignments, each possible assignment in the set of possible assignments corresponding to a combination of labels and disparate audio signal sources;
obtain a plurality of spatially filtered signals, wherein a total number of spatially filtered signals equal to the total number of the plurality of labels;
determine assignment error scores for each of the set of possible assignments, the assignment error scores determined based at least in part on a difference between labels of the plurality of labels for respective output layers for a respective possible assignment and the plurality of spatially filtered signals;
determine which individual audio signal sources to associate with individual estimates based at least in part on a minimum total deviation between training data associated with the individual audio signal sources and the individual estimates, wherein the minimum total deviation is a lowest assignment error of the assignment error scores;
generate a set of masks by iteratively modifying parameters of the model to reduce the minimum total deviation; and
generate the two or more audio source signals from the first monaural signal by using the set of masks, the source of the two or more audio source signals being different from a source of the audio source signals in the second monaural signal.

14. A system as claim 13 recites, wherein at least one of the one or more processors is
a graphics processing unit; and
wherein the graphics processing unit is configured to run the model to generate the estimates of the audio source signals.

15. A system as claim 13 recites, the processors further configured to:
shift a current window of the mixed signal by one or more frames to obtain an adjacent window, wherein the adjacent window and the current window have overlapping frames; and
select an assignment order for the adjacent window based at least in part on the assignment order being associated with a minimum total error score or a similarity score for overlapping portions of the adjacent window and the current window.

16. A system as claim 13 recites, the processors further configured to estimate separated audio source signals based at least in part on assignment orders for the current window and the adjacent window.

17. A method for separating two or more audio source signals from a first monaural signal having audio source signals and noise source signals, the method comprising:
generate, from a window of frames of a second monaural signal, output layers comprising estimates of audio source signals attributable to disparate audio signal sources contributing to the second monaural signal;
generating a plurality of labels, wherein a total number of the plurality of labels is equal to a total number of the disparate audio signal sources;
iteratively assigning the plurality of labels to the disparate audio signal sources for possible combinations of labels and disparate audio signal sources to create a set of possible assignments, each possible assignment in the set of possible assignments corresponding to a combination of labels and disparate audio signal sources;
obtaining a plurality of spatially filtered signals, wherein a total number of spatially filtered signals equal to the total number of the plurality of labels;
determining assignment error scores for each of the set of possible assignments, the assignment error scores determined based at least in part on a difference between labels of the plurality of labels for respective output layers for a respective possible assignment and the plurality of spatially filtered signals;
determining an assignment pattern for the estimates, the assignment pattern defining which individual audio signal sources are associated with which individual estimates based at least in part on a minimum total pairwise deviation between training data associated with the individual audio signal sources and the individual estimates, wherein the minimum total pairwise deviation is a lowest assignment error score of the assignment error scores;
generate a set of masks by iteratively modifying parameters of the model to reduce the minimum total deviation; and
generate the two or more audio source signals from the first monaural signal by using the set of masks and the assignment pattern, the source of the two or more audio source signals being different from a source of the audio source signals in the second monaural signal.

18. A method as claim 17 recites further comprising:
tracing a speaker or a noise through multiple frames of the first monaural signal based at least in part on assignment patterns associated with the multiple frames.

19. A method as claim 17 recites further comprising:
separating a channel attributable to one of the individual audio signal sources based at least in part on the assignment pattern using the determined assignment pattern.

20. A method as claim 19 recites, wherein separating the channel attributable to one of the individual audio signal sources includes:
identifying a subset of frames of the monaural signal that correspond with the one of the individual audio signal sources, the subset of frames including frames associated with an average of assignments over windows containing the frames that corresponds with the one of the individual audio signal sources; and
associating the subset of frames with the one of the individual audio signal sources to obtain the channel attributable to the one of the individual audio signal sources.

* * * * *